June 19, 1928.  
J. R. GAMMETER ET AL  
1,674,171  
METHOD AND APPARATUS FOR PRODUCING TUBULAR, FIBROUS STRUCTURES  
Filed April 11, 1925  
17 Sheets-Sheet 1

Inventors.  
John R. Gammeter  
Florain J. Shook  
George F. Wilson.  
By Robert M. Pierson  
Atty

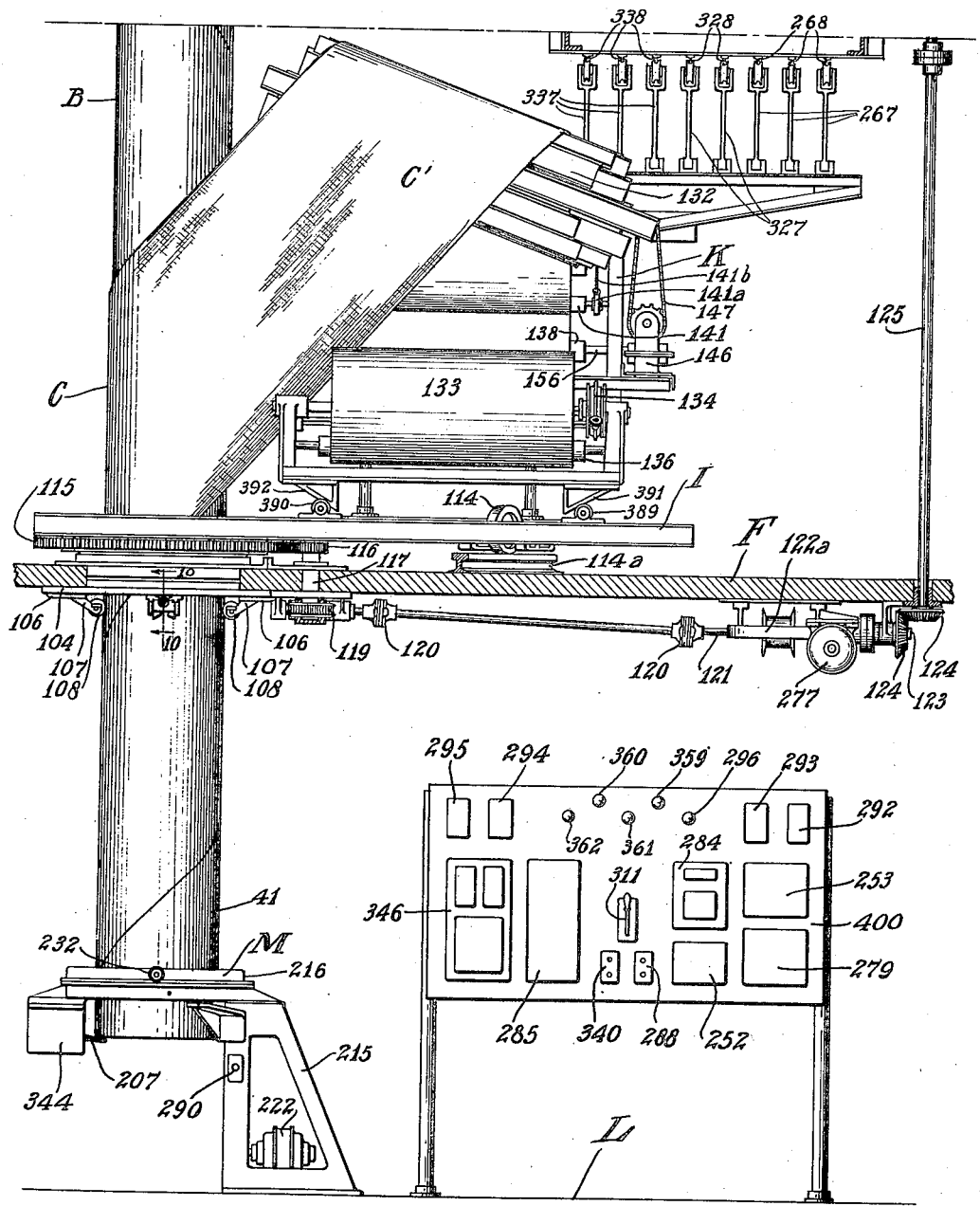

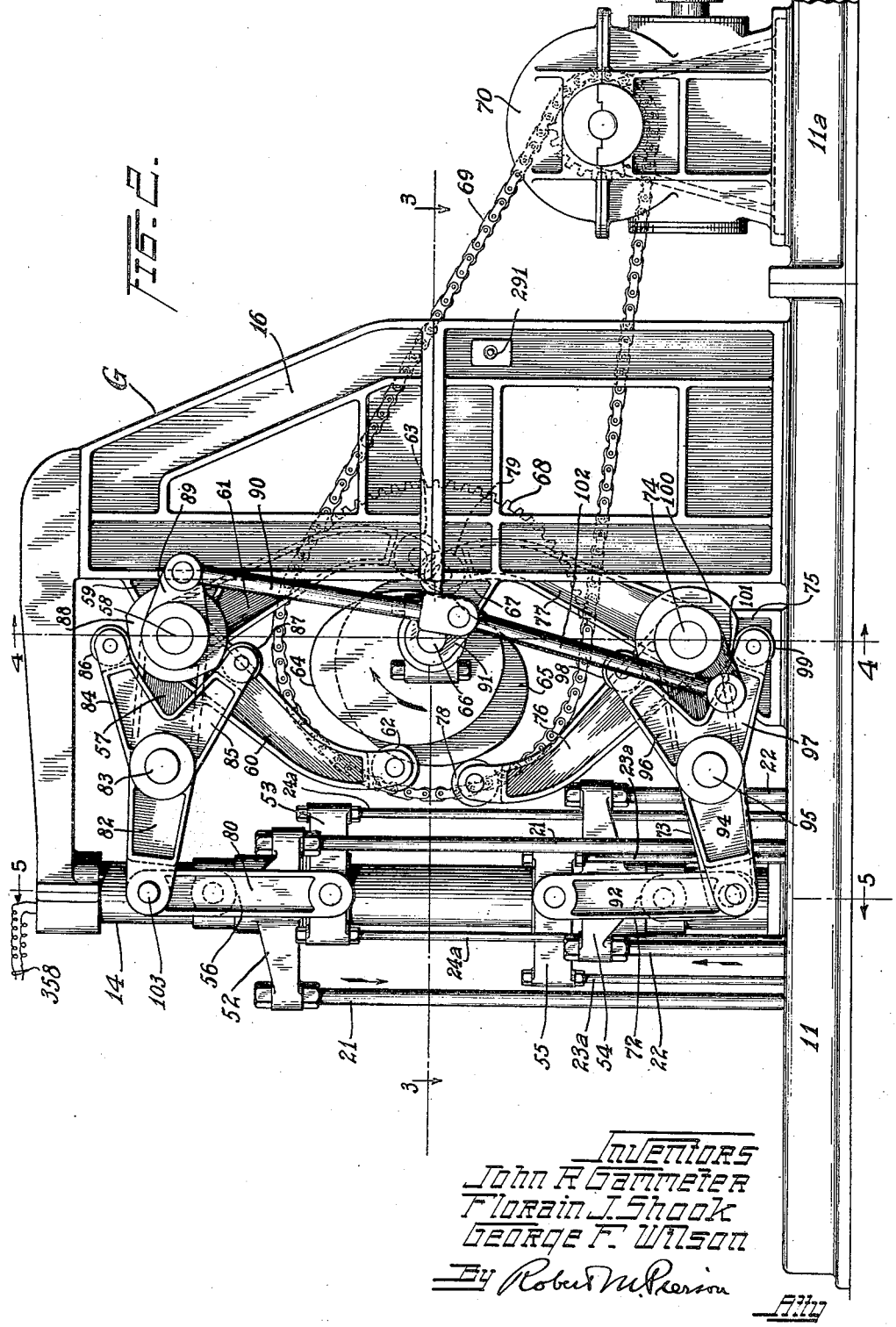

June 19, 1928.
J. R. GAMMETER ET AL
1,674,171
METHOD AND APPARATUS FOR PRODUCING TUBULAR, FIBROUS STRUCTURES
Filed April 11, 1925     17 Sheets-Sheet 4
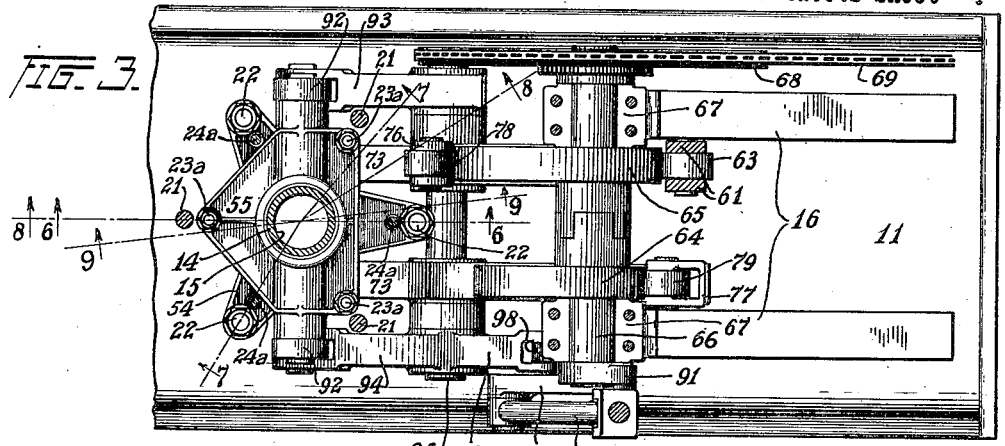
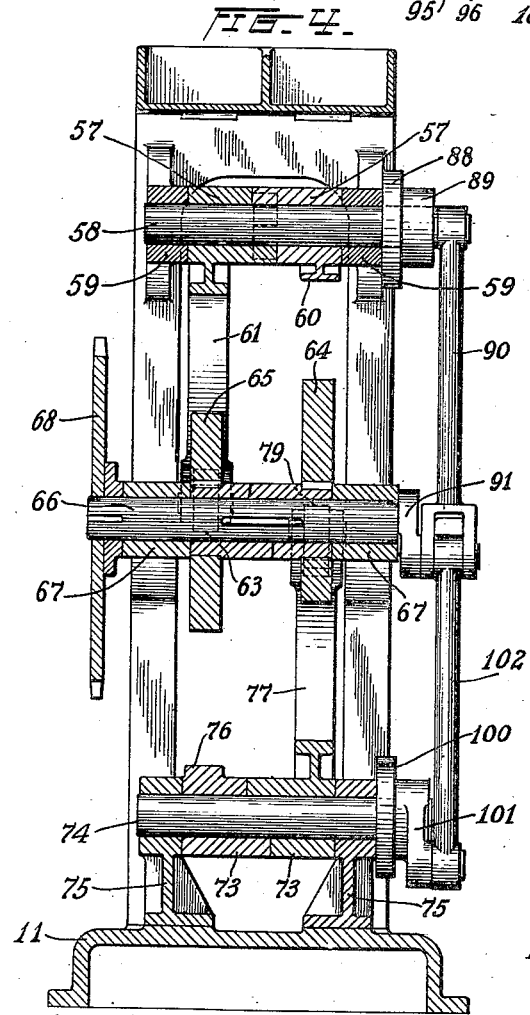
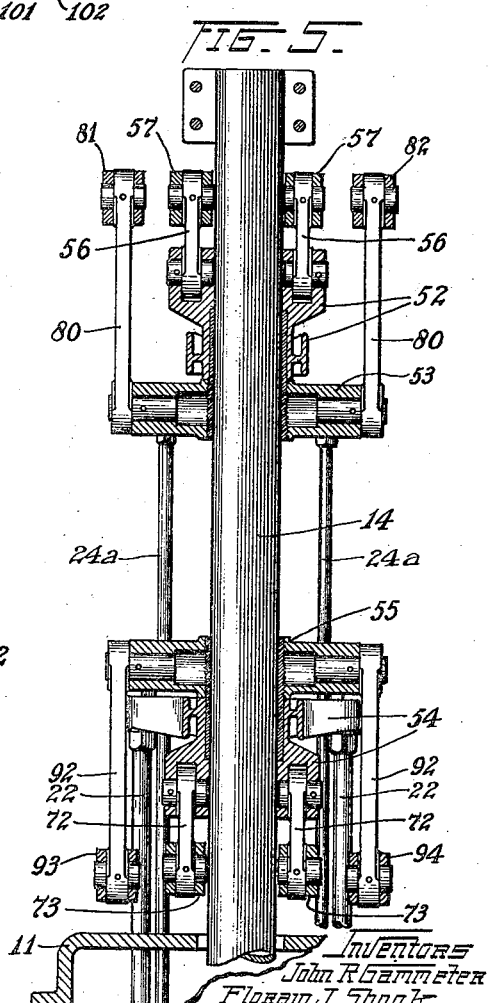

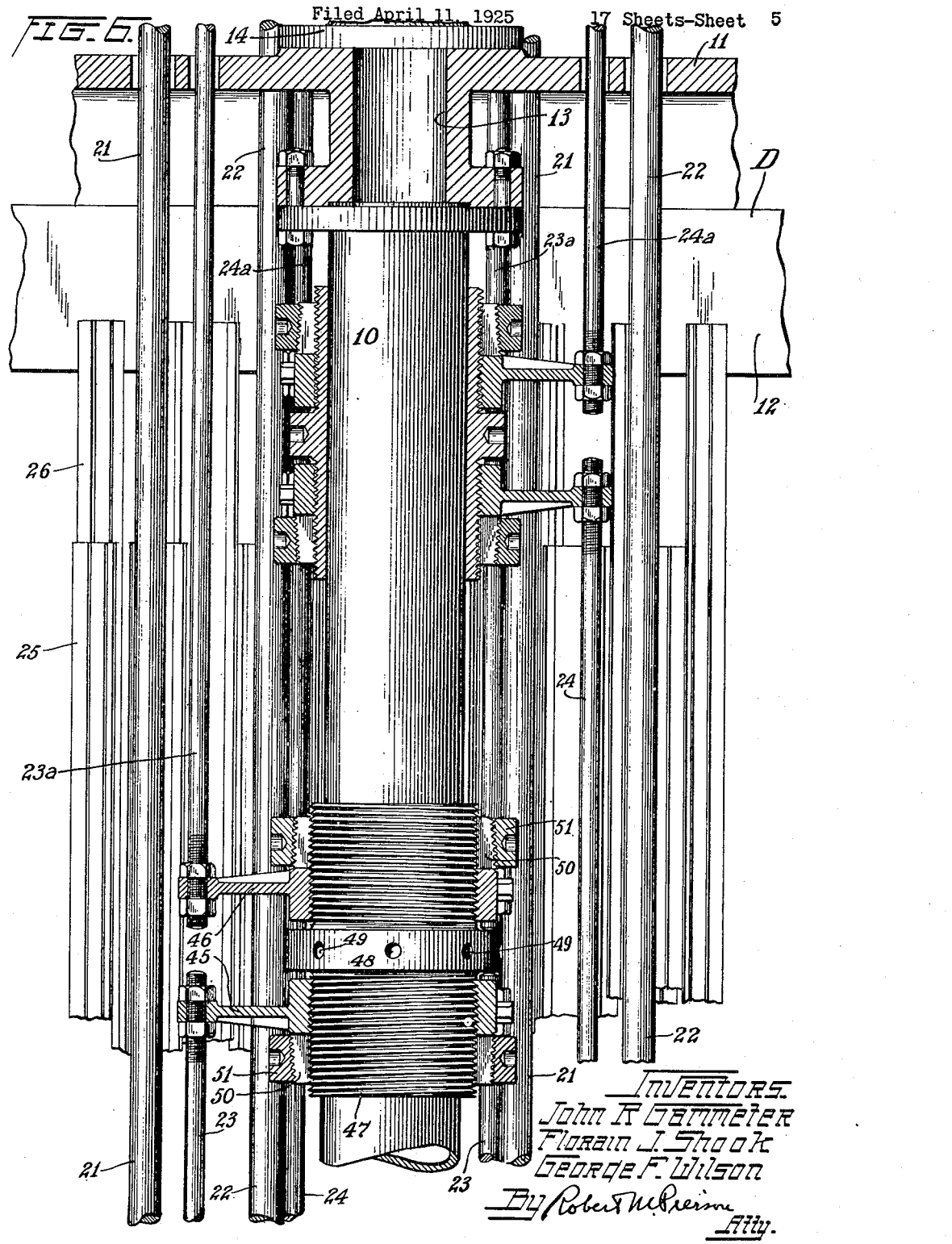

June 19, 1928.
J. R. GAMMETER ET AL
1,674,171
METHOD AND APPARATUS FOR PRODUCING TUBULAR, FIBROUS STRUCTURES
Filed April 11, 1925  17 Sheets-Sheet 6
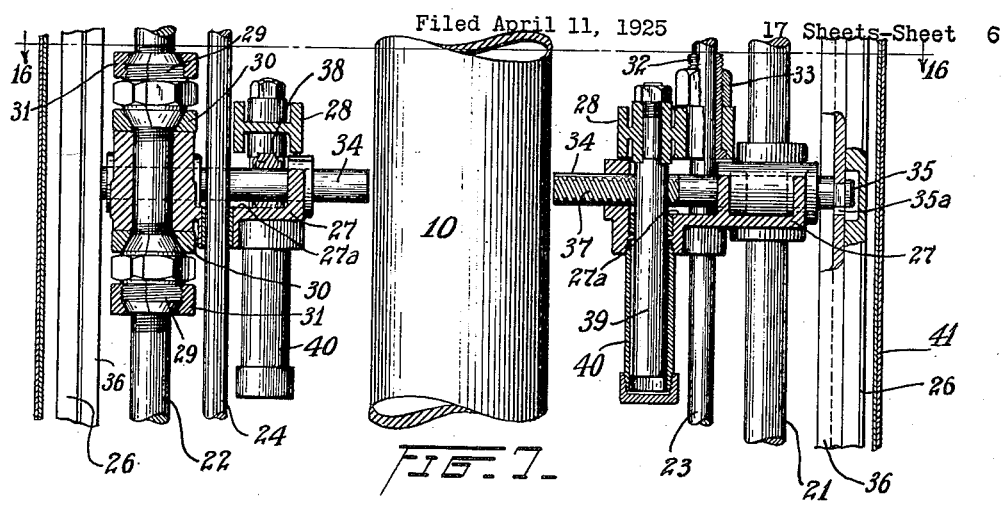
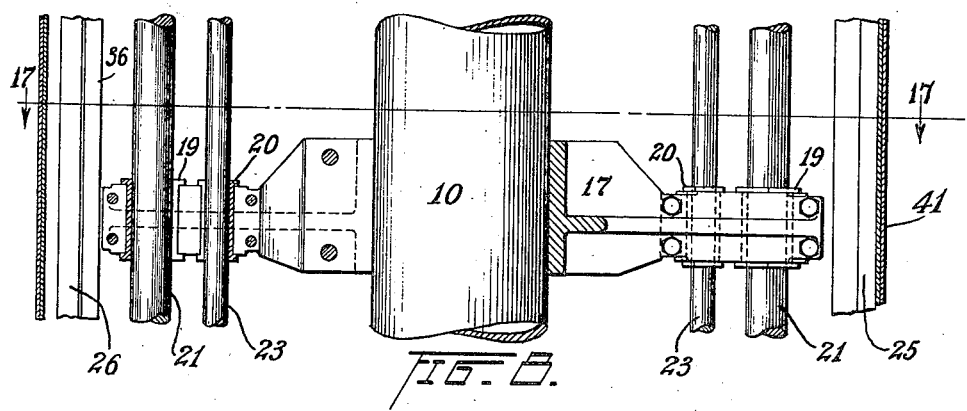
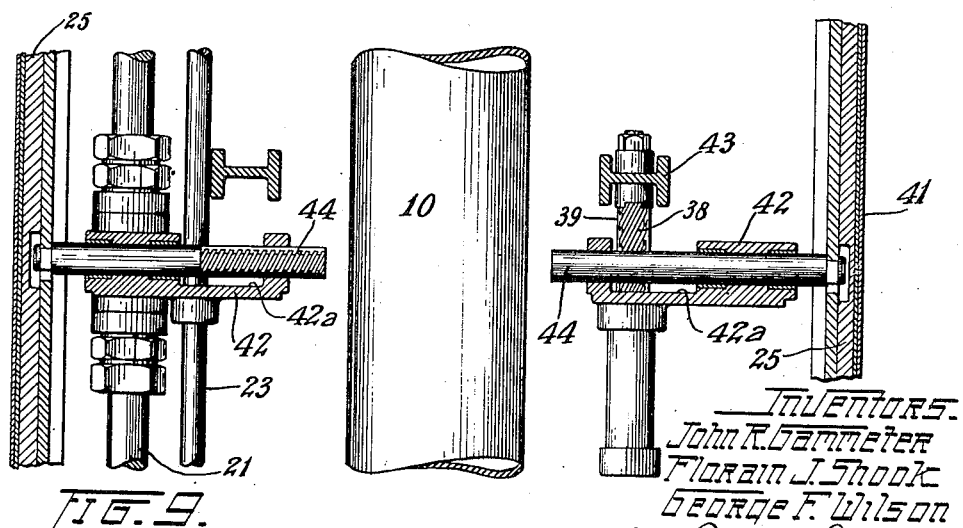

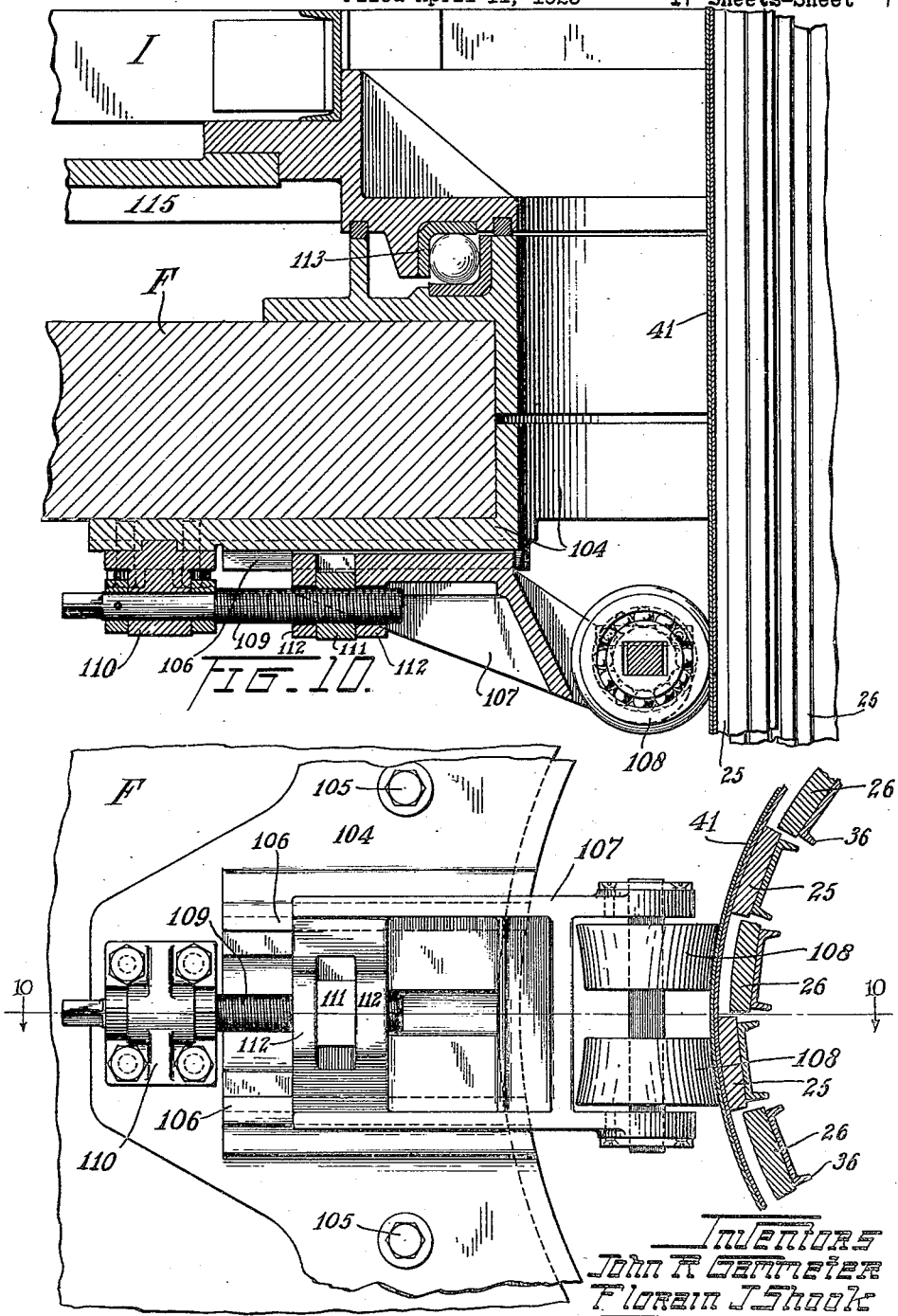

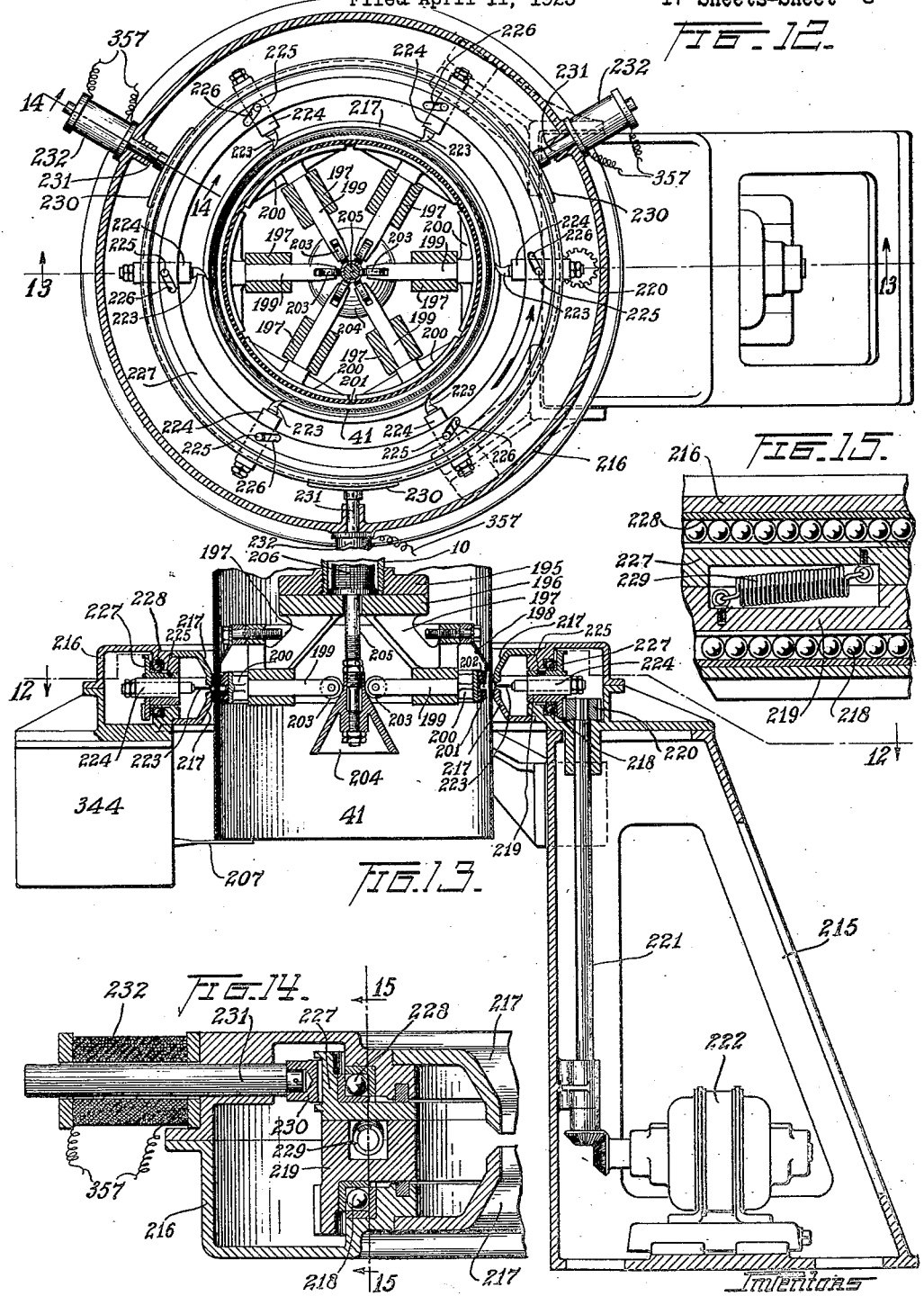

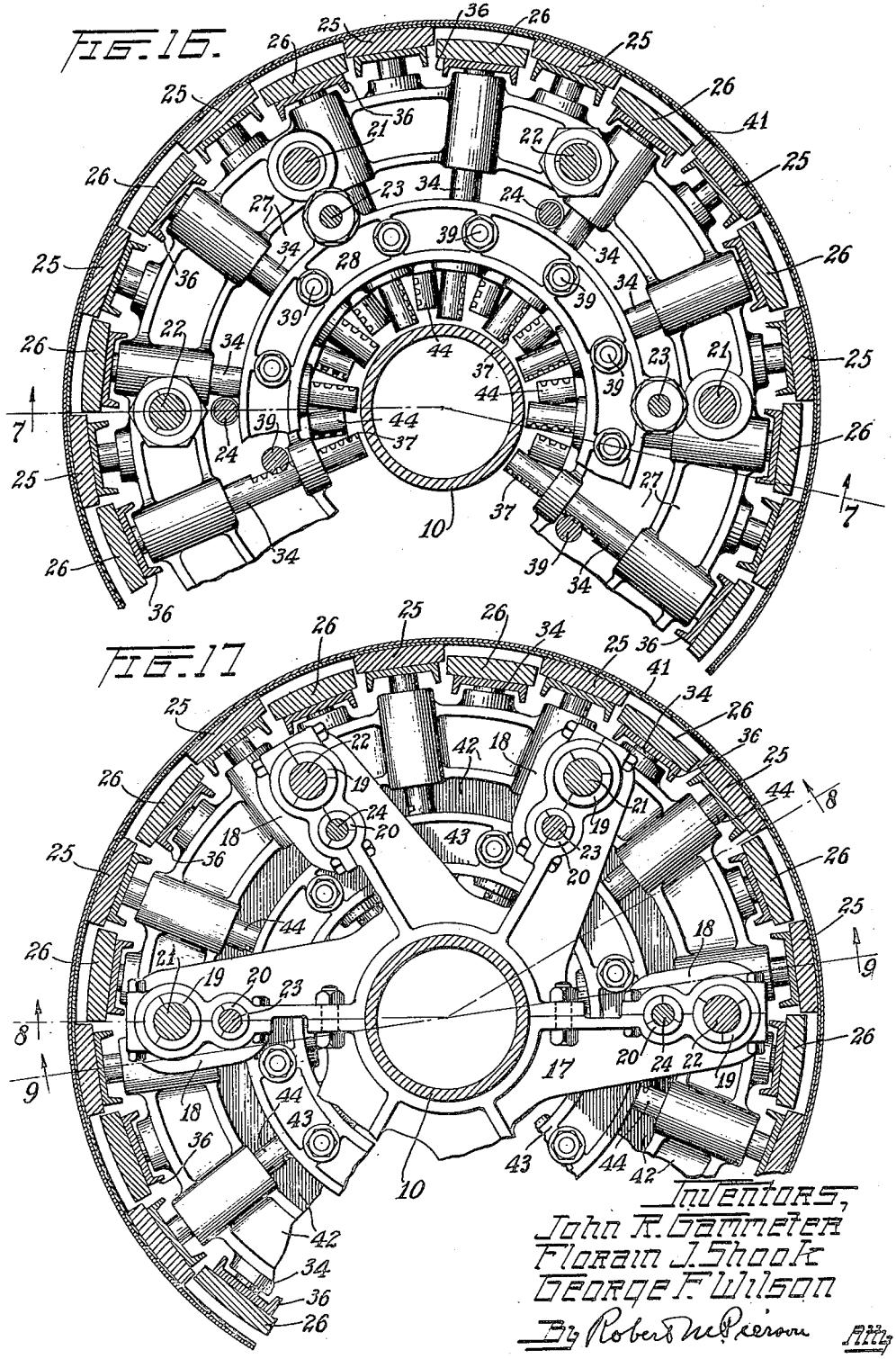

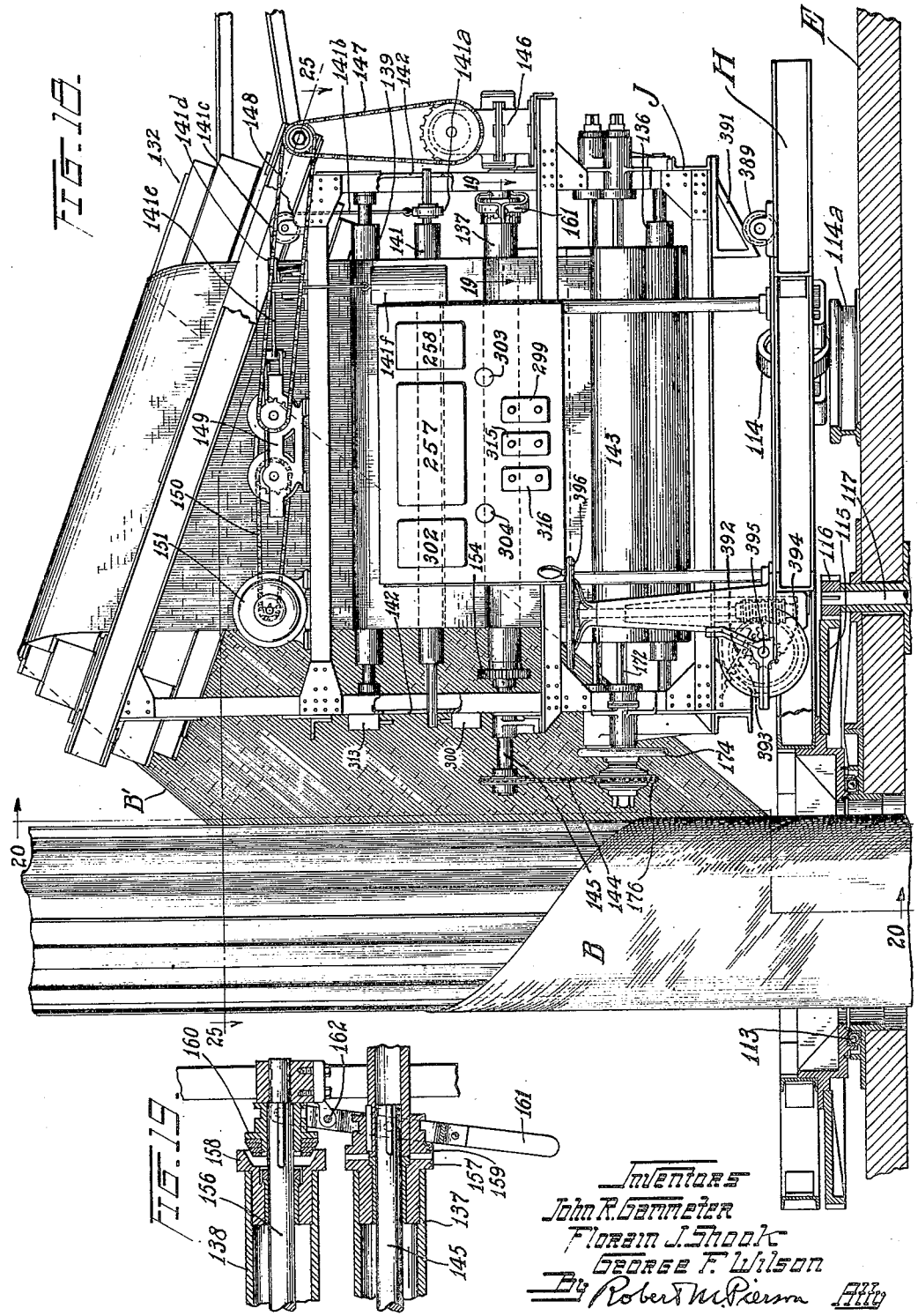

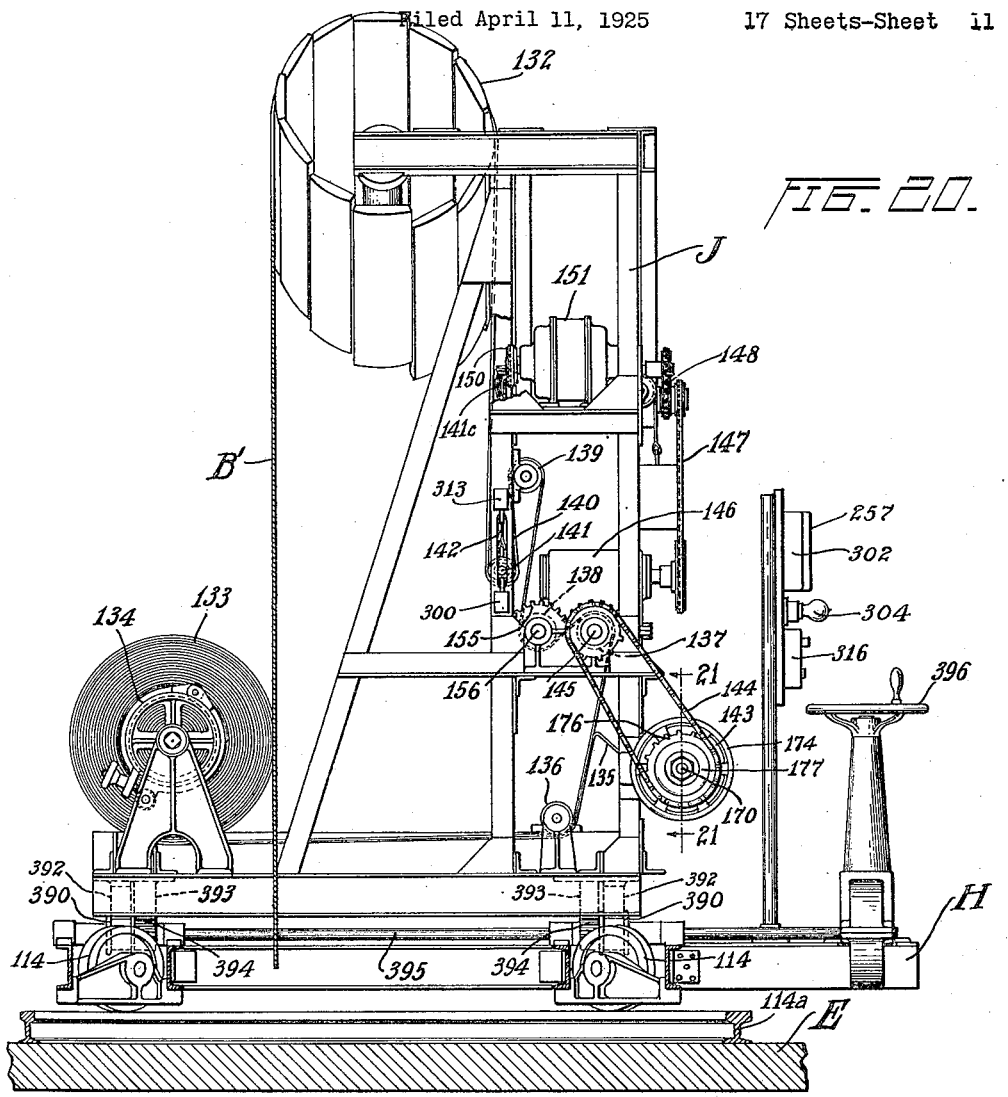
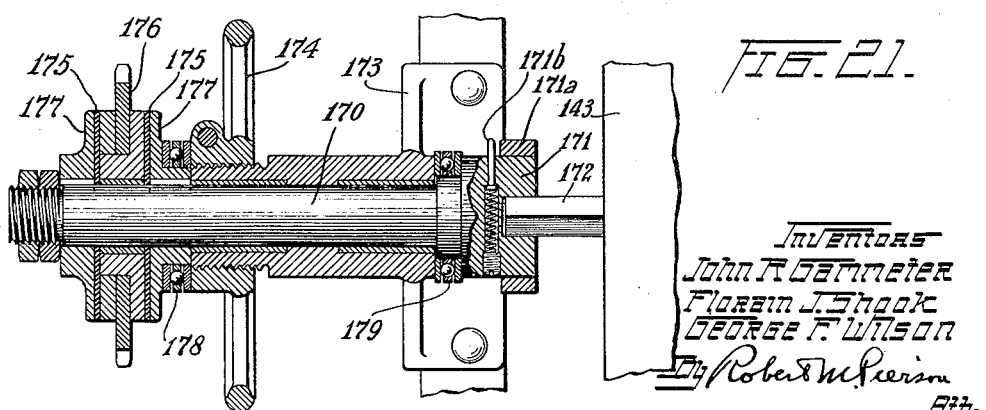

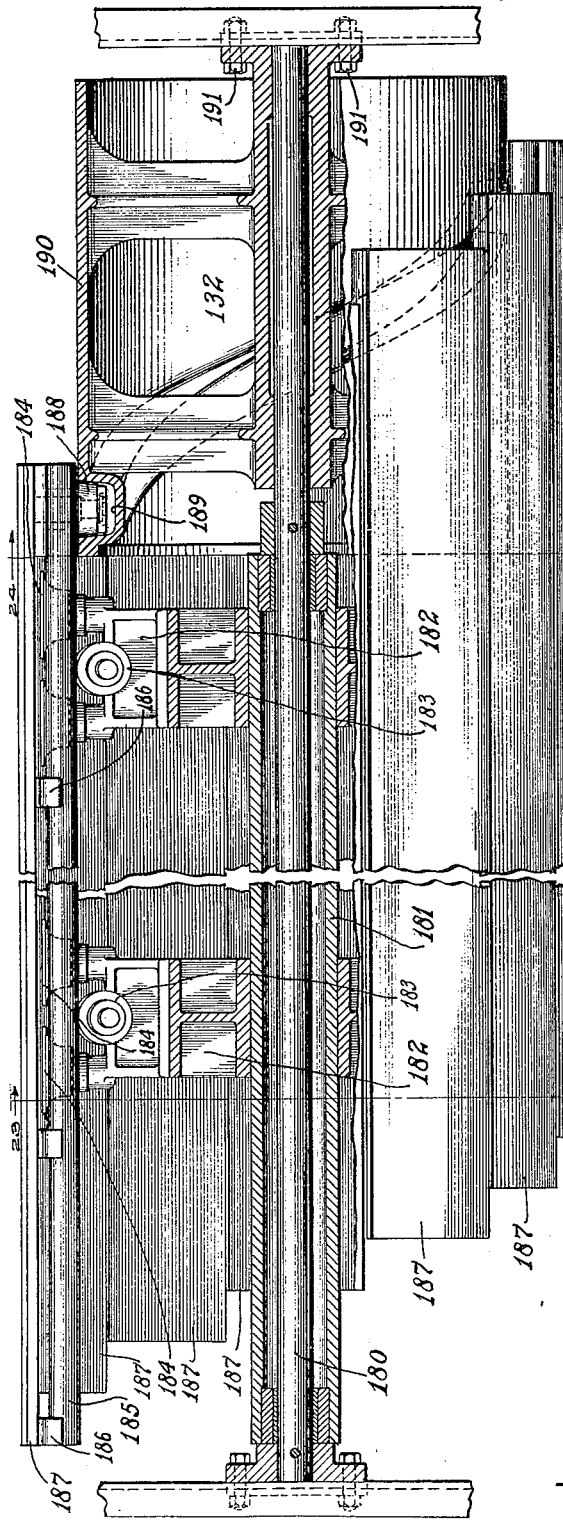
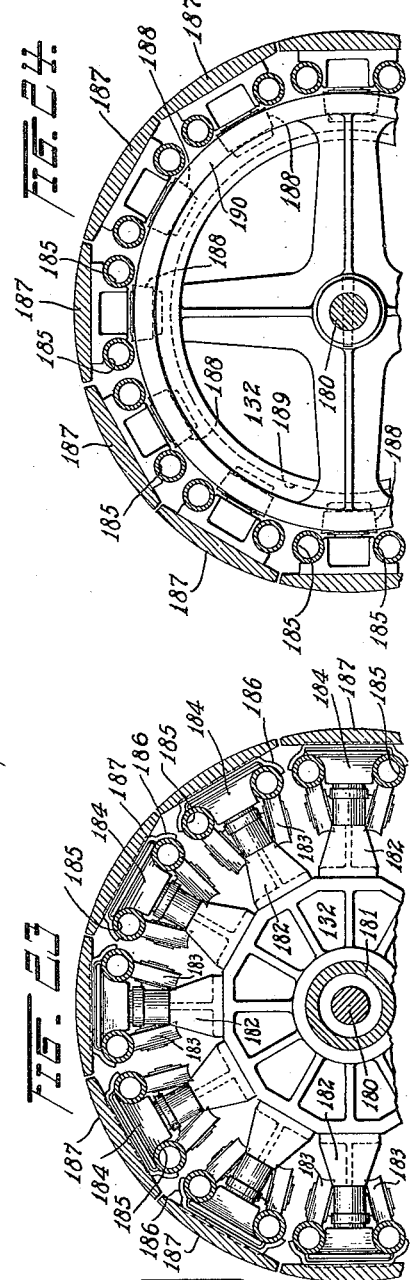

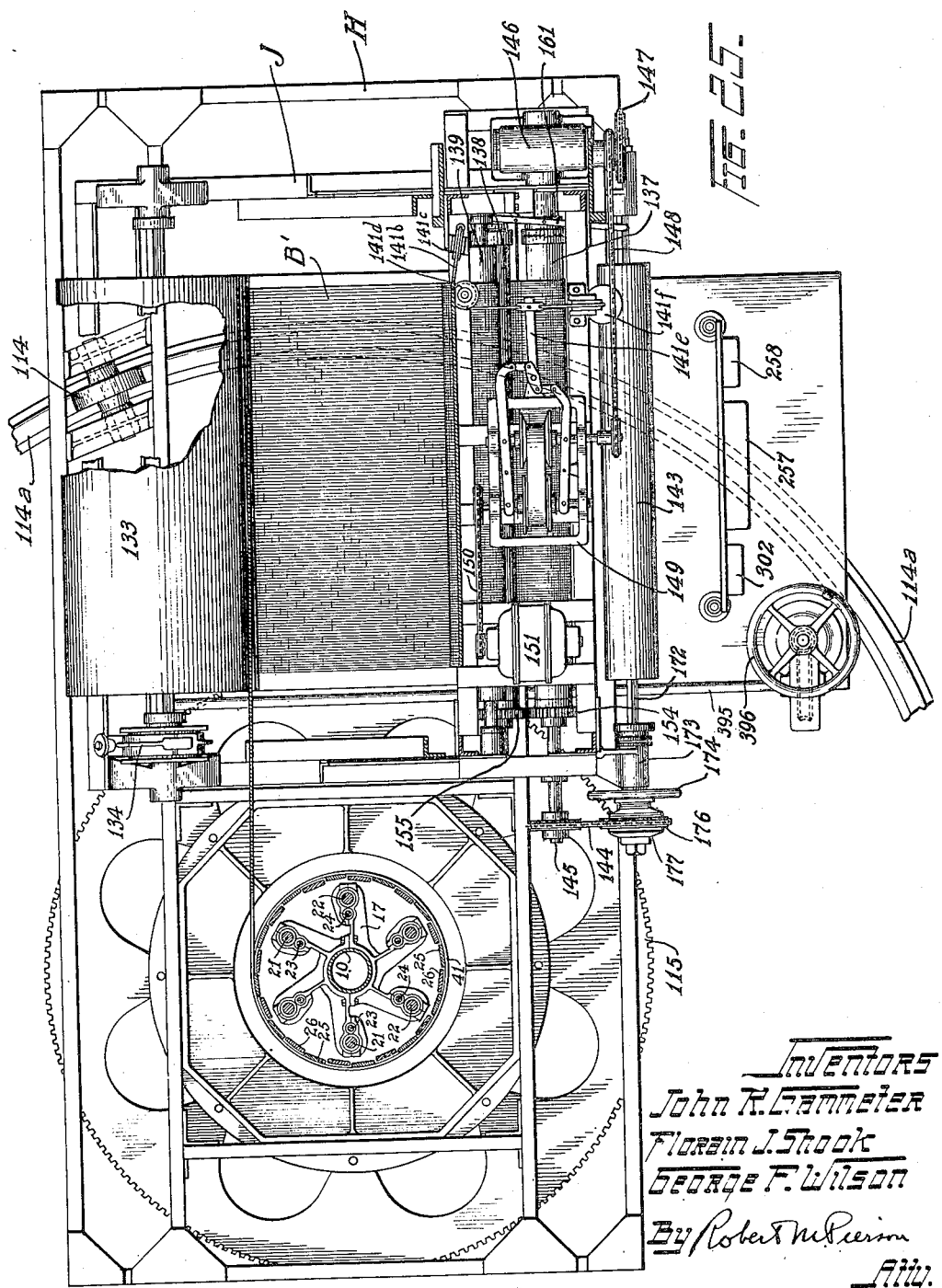

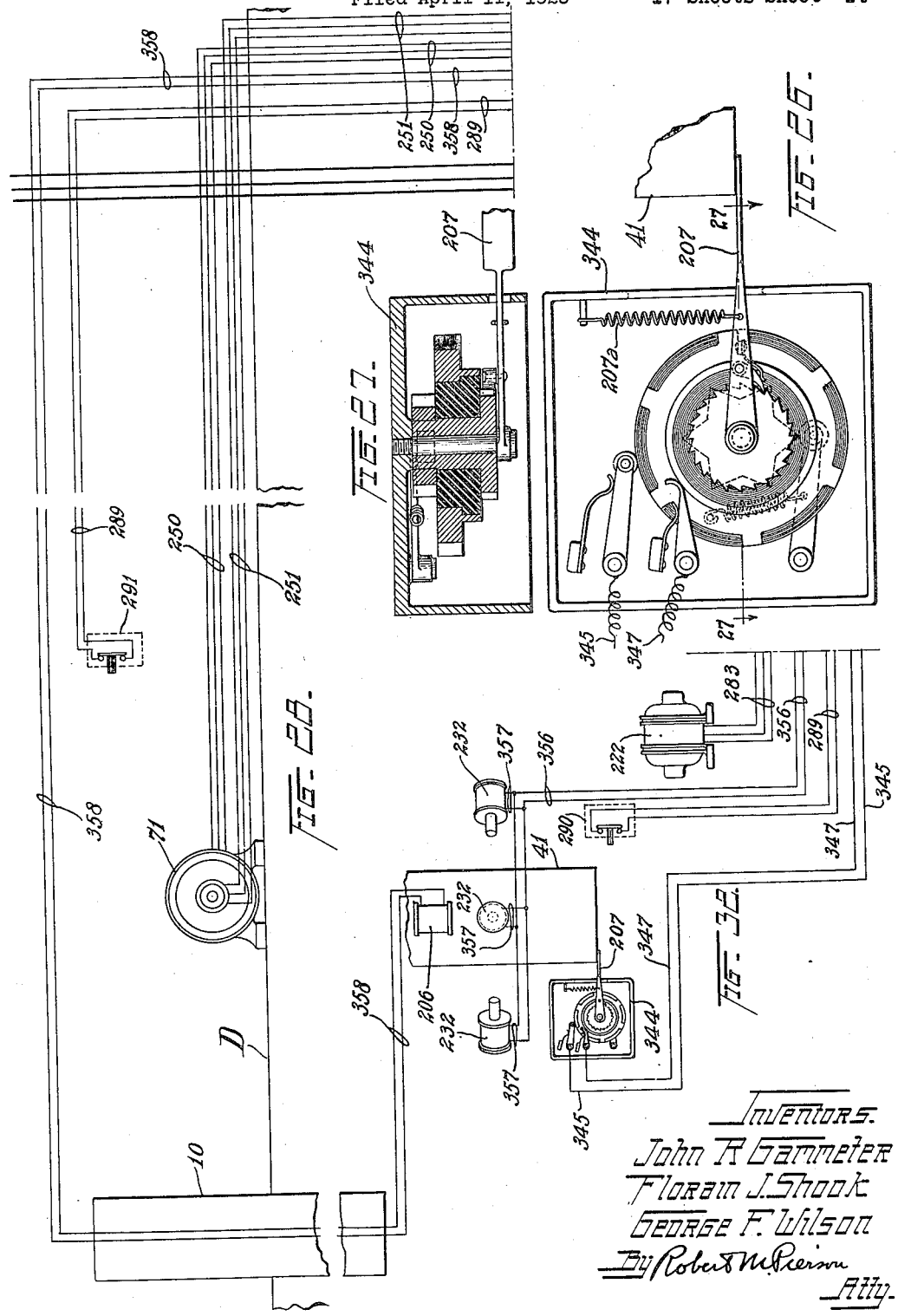

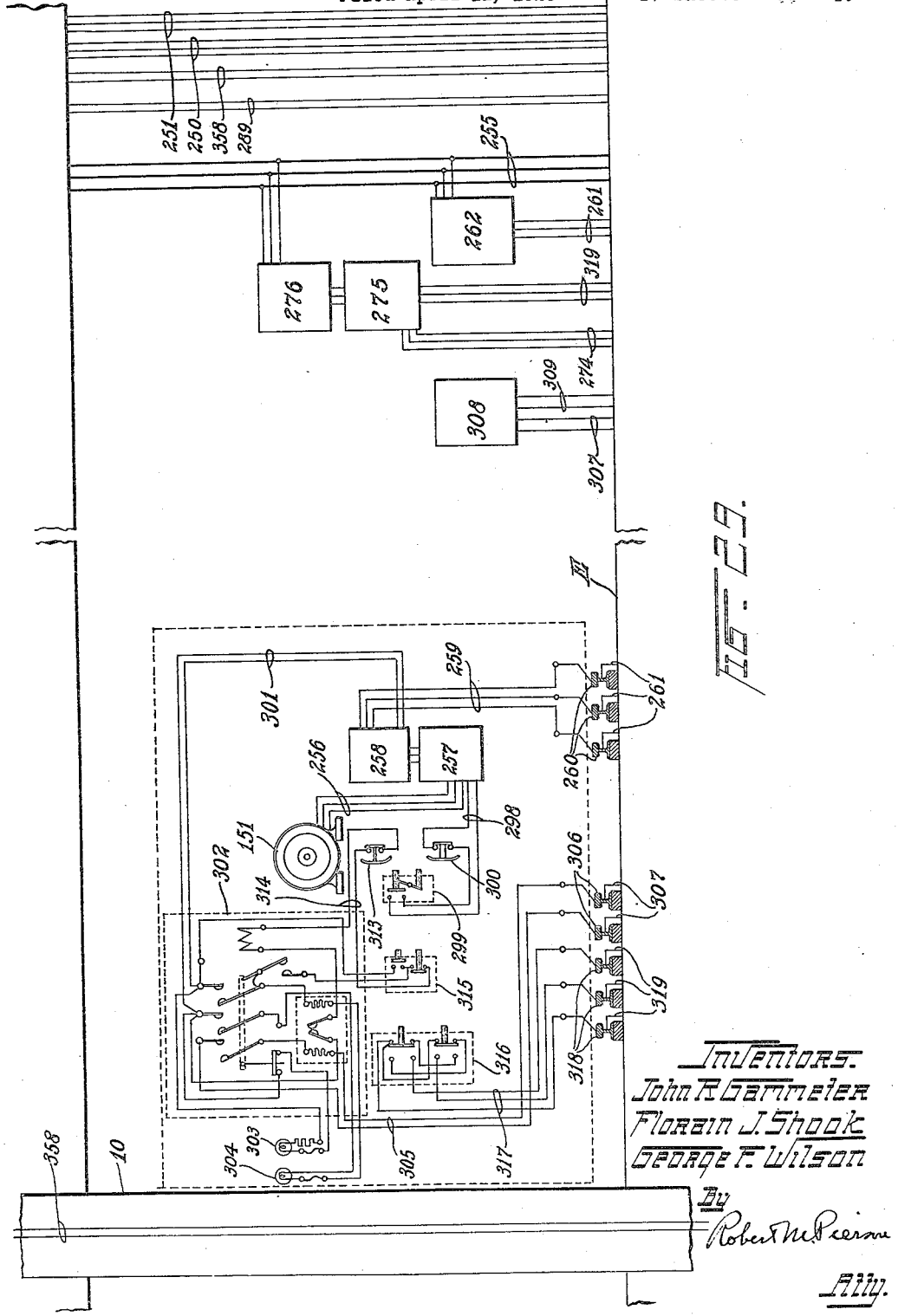

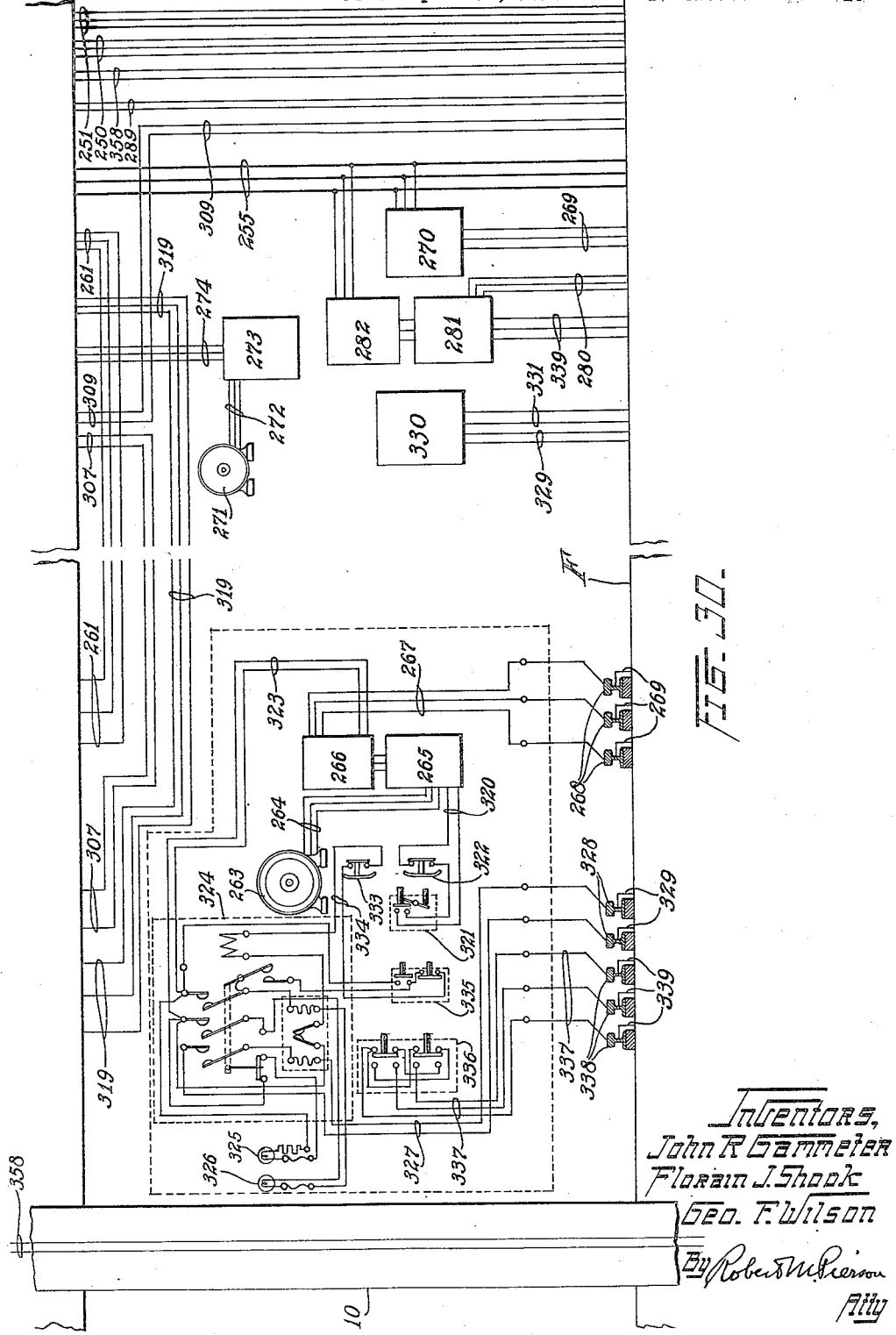

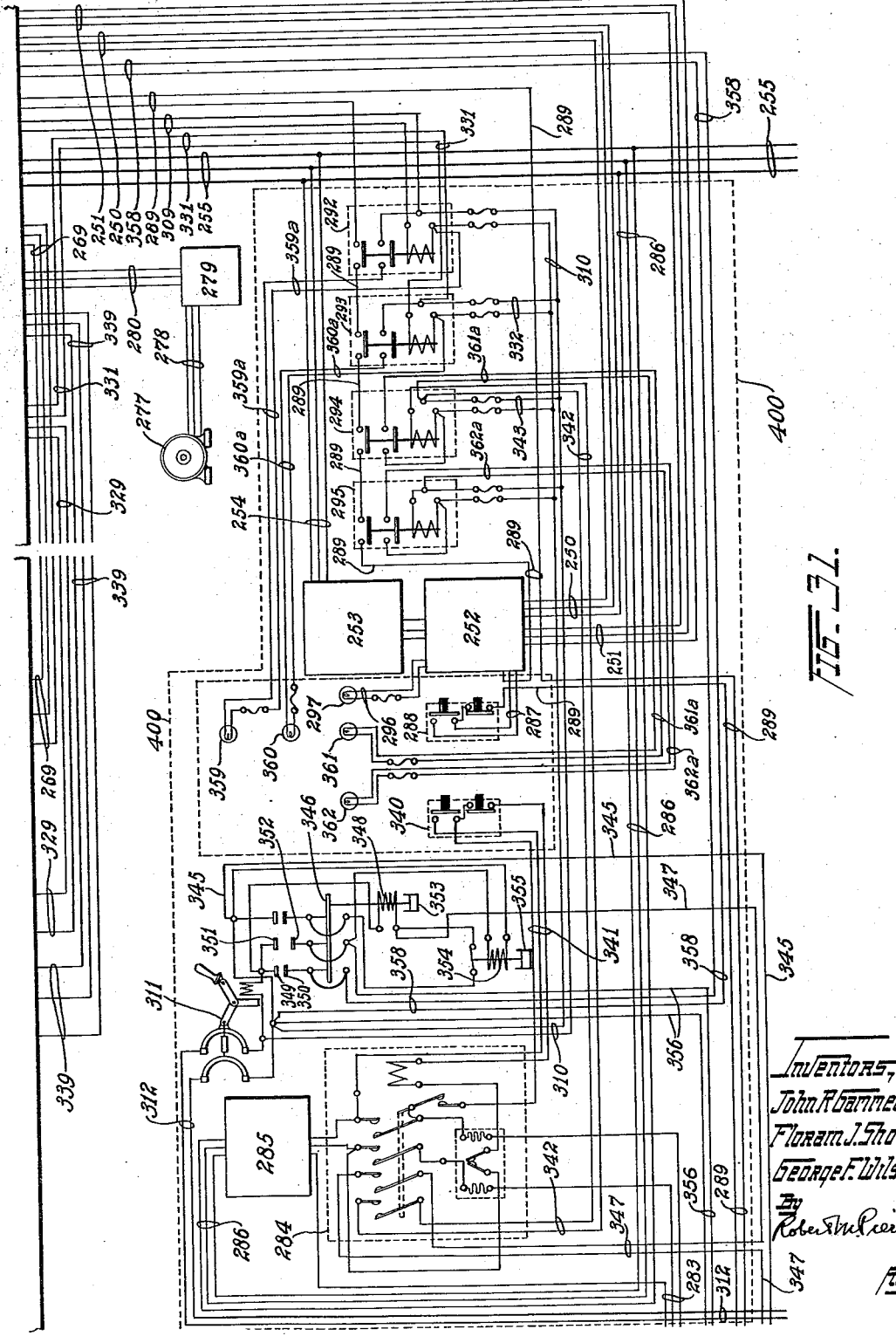

Patented June 19, 1928.

1,674,171

UNITED STATES PATENT OFFICE.

JOHN R. GAMMETER, FLORAIN J. SHOOK, AND GEORGE F. WILSON, OF AKRON, OHIO, ASSIGNORS TO THE B. F. GOODRICH COMPANY, OF NEW YORK, N. Y., A CORPORATION OF NEW YORK.

METHOD AND APPARATUS FOR PRODUCING TUBULAR, FIBROUS STRUCTURES.

Application filed April 11, 1925. Serial No. 22,268.

This invention relates to methods and apparatus for producing strips or bands of rubberized fibrous material in convenient form, for use in the building of pneumatic tires, for example, the present invention being an improvement upon that of John R. Gammeter's application Serial No. 586,992, filed September 8, 1922, Patent No. 1,604,273, Oct. 26, 1926. The said Gammeter application describes and claims procedure and apparatus whereby endless tire bands may be formed by helically winding strips of rubberized fabric in opposite directions upon a projecting mandrel, to form a two-ply tubular structure of fabric thereon, while withdrawing the wound tubular structure from the mandrel, and severing the tubular structure into endless bands.

The chief objects of the present invention are to provide an improved type of mandrel structure; to eliminate the necessity of a liner for the wound fabric structure; to provide for more uniform and accurate winding of the strip of material onto the mandrel structure; to avoid the necessity of pulling the tubular structure from the mandrel or of flattening it in withdrawing it or in severing it into endless bands; and to provide means adapted automatically to sever the tubular structure into endless bands as it passes from the mandrel structure, preferably without flattening it and without interfering with its continuous feed. Further and more specific objects will be made manifest in the following description.

Of the accompanying drawings:

Figs. 1^A and 1^B together constitute an elevation of apparatus embodying and adapted to carry out our invention in its preferred form, certain floors of the building in which it is housed being shown in section.

Fig. 2 is a side elevation, from the same viewpoint as in Fig. 1^A, of the top portion of the apparatus, rising above the uppermost floor, and comprising supporting and actuating means for a downwardly extending mandrel structure.

Fig. 3 is a horizontal section on line 3—3 of Fig. 2.

Fig. 4 is a vertical section on line 4—4 of Fig. 2.

Fig. 5 is a vertical section on line 5—5 of Fig. 2.

Figure 1A:
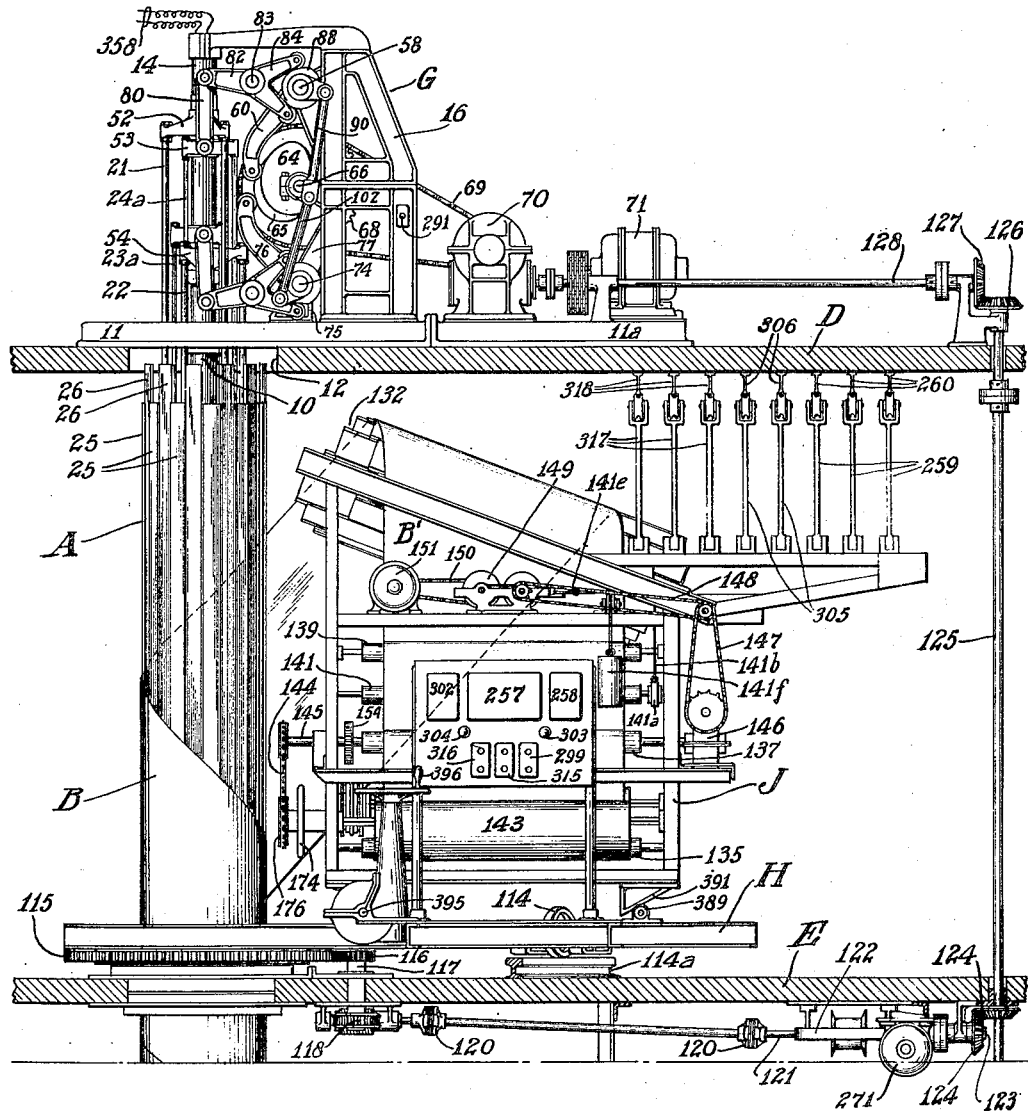

Fig. 6 is a vertical section, on line 6—6 of Fig. 3, of the portion of the mandrel structure adjacent and immediately below the uppermost floor, said mandrel structure comprising two intercalated sets of vertical winding-form bars constituting a cylindrical grating structure adapted to receive the windings of fabric, and means for so moving the two sets of bars with relation to each other as to support the winding in substantially cylindrical form while moving the same downward as it is wound.

Fig. 7 is a fragmentary vertical section, on line 7—7 of Figs. 3 and 16, of the mandrel structure and the work thereon, showing devices such as are provided at intervals throughout the length of the mandrel structure for supporting and actuating one of the two sets of vertical winding-form bars which provide the winding surface of the mandrel structure.

Fig. 8 is a fragmentary vertical section, on line 8—8 of Figs. 3 and 17, of the mandrel structure and the work thereon, showing one of a plurality of guides which are employed at spaced intervals throughout the length of the mandrel structure for guiding the supporting and actuating members for the winding-form bars.

Fig. 9 is a fragmentary vertical section, on line 9—9 of Figs. 3 and 17, of the mandrel structure and the work thereon, showing devices such as are provided at intervals throughout the length of the mandrel structure for supporting and actuating the set of winding-form bars which are intercalated with those which are supported and actuated by the devices of Fig. 7.

Fig. 10 is a fragmentary vertical section on line 10—10 of Figs. 1^B and 11, of a part of the apparatus at a position where the mandrel structure extends through one of the floors of the building, showing roller means adapted to bear against the tubular fabric structure as the latter is fed downward by the mandrel structure, to prevent oscillation or misalignment of said structure.

Fig. 11 is a reversed plan view of the parts of the apparatus shown in Fig. 10, the winding form bars and the work thereon being shown in section.

Fig. 12 is a horizontal section on line 12—12 of Fig. 13, showing means for severing the tube of wound fabric into endless bands.

Fig. 13 is a vertical section on line 13—13 of Fig. 12.

Fig. 14 is a vertical section on line 14—14 of Fig. 12.

Fig. 15 is a vertical section on line 15—15 of Fig. 14.

Fig. 16 is a horizontal section on line 16—16 of Fig. 7.

Fig. 17 is a horizontal section on line 17—17 of Fig. 8.

Fig. 18 is an elevation of a part of the apparatus including means for supporting a supply of fabric and winding it onto the mandrel structure, the supporting floor and parts of the winder carriage being shown in section.

Fig. 19 is a horizontal section on line 19—19 of Fig. 18.

Fig. 20 is a vertical section on line 20—20 of Fig. 18.

Fig. 21 is a vertical section on line 21—21 of Fig. 20, showing the mounting of a liner-rewinding roll.

Fig. 22 is a longitudinal section of a fabric guiding device.

Fig. 23 is a section on line 23—23 of Fig. 22.

Fig. 24 is a section on line 24—24 of Fig. 22.

Fig. 25 is a section on line 25—25 of Fig. 18.

Fig. 26 is a vertical section through an electric switch box shown at the lower-left portion of Fig. 1$^B$.

Fig. 27 is a section on line 27—27 of Fig. 26.

Fig. 28 is a diagram of the electric wiring pertaining to the upper portion of Fig. 1$^A$.

Fig. 29 is a diagram of the electric wiring pertaining to the lower portion of Fig. 1$^A$.

Fig. 30 is a diagram of the electric wiring pertaining to the upper portion of Fig. 1$^B$.

Fig. 31 is a diagram of the electric wiring pertaining to the lower right-hand portion of Fig. 1$^B$.

Fig. 32 is a diagram of the electric wiring pertaining to the lower left-hand portion of Fig. 1$^B$.

*General description.*

Referring to the drawings, the apparatus comprises a mandrel structure A (see Fig. 1$^A$) adapted to receive oppositely pitched helical windings B and C (Figs. 1$^A$ and 1$^B$) of rubberized fabric to form thereon a tubular fabric structure of such diameter as to be severed transversely into endless tire-building bands. Said mandrel structure is suspended from the upper floor D of the building in which the apparatus is housed, extends downward through suitable openings in floors E and F of said building, and comprises two intercalated sets of vertical bars constituting a substantially cylindrical winding form, the bars of each set being adapted to be moved radially outward and downward, and then radially inward and upward, in alternation with those of the other set, to provide a continuous downward feeding of the tubular fabric structure which is continuously formed upon the mandrel structure by the fabric windings B and C. A mandrel actuating mechanism G (Figs. 1$^A$ and 2) is mounted upon the uppermost floor D, and annular turn-tables or winder rings H and I, carrying respective fabric supply carriages J and K, are mounted upon the next lower floors, E and F, respectively. Mounted upon the lowermost floor L is a tube severing device M having an annular knife supporting portion adapted to receive through its central aperture the tubular fabric structure as the latter passes from the projecting lower end of the mandrel structure, means being provided for actuating a set of knives mounted in the annular knife supporting portion of the severing device M to cause said knives periodically to move radially inward to engage the fabric and, during a partial revolution about the axis of the fabric tube, to sever the latter into successive endless bands suitable for use in the building of pneumatic tires.

*Mandrel structure.*

The mandrel structure comprises a downwardly projecting hollow arbor 10 secured at its upper end to a metal base member 11 (see Fig. 6) mounted upon the uppermost floor D and bridging an aperture 12 which is formed in said floor to accommodate the upper portion of the mandrel structure, said base member being formed with a vertical aperture 13 communicating with the bore of the hollow arbor 10, (Fig. 6). Mounted upon the upper face of the base 11 is a vertical guide post 14 formed with a central bore 15, Fig. 3, registered with the aperture 13 of the base 11, the upper end of said guide post being clamped in a lateral arm formed on a bearing frame 16 (Figs. 1$^A$ and 2) rising from the base 11, (see Fig. 2).

Clamped upon the arbor 10 at spaced intervals are divided spiders such as the one shown at 17, Figs. 8 and 17, each arm thereof being provided with a separable block 18 adapted with said arm to clamp in position a guide bushing 19, for a vertical bar-supporting rod 21 or 22, and a guide bushing 20 for a bar-actuating rod 23 or 24. The rods 21 and 24 are adapted to actuate one set of vertical winding-form bars, 25, 25, and the rods 22, 23 are adapted to actuate the alternate winding-form bars, 26, 26.

The rods 22, of which three are employed in the construction here shown, are provided with means hereinafter described for moving them up and down in unison, and at each of several spaced positions throughout the length of the mandrel structure said rods have secured thereon in common an annular, bar-supporting casting 27 (Figs. 7 and 16) surrounding the arbor 10. Their associated bar-actuating rods 23 are also adapted to be moved up and down in unison, by means hereinafter described, but with a stroke differing from that of the rods 22, and secured upon the bar-actuating rods 23, just above each of the bar-supporting castings 27, is a smaller, annular, bar-actuating casting 28 (Figs. 7 and 16), the strokes of the bar-supporting rods 22 and of the bar-actuating rods 23 being of such length and so timed that the casting 27 in the down stroke is spaced ahead of the casting 28, the latter more closely approaching the casting 27 at the bottom of the stroke, the two then moving upward together, and the casting 27 then moving ahead again at the beginning of the succeeding down stroke. The several castings 28, by such movement with relation to their respective castings 27, are adapted, through means hereinafter described, to move the alternate winding form bars 26 radially outward at the beginning of the down stroke and radially inward at the end of the down stroke.

The several castings 27 are attached to each of the rods 22 as shown most clearly in Fig. 7, where it will be seen that the rod 22 passes through an aperture in the casting 27 and, as a matter of convenience in construction the rod is threaded at each side of the casting and provided with segmental nuts 29, 29 having coned ends, each segmental nut 29 being secured in assembled relation by a female coned collar 30, abutting the casting 27, and a coned lock nut 31 screwed onto the outer end of the segmental nut 29, the two nut assemblies thus being adapted to be set up, on the rod 22, to clamp between them the casting 27.

The bar-actuating rods 23 extend through the castings 27 with a free sliding fit, and each of them is secured to each of the castings 28 by means of a flanged, segmental bushing 32 mounted in the casting 28 and having internal threads meshed with male threads formed on the rod 23, each of said bushings having a lock nut 33 screwed upon it to prevent turning of the segmental bushing with relation to the rod 23 and the casting 28.

Each of the bar-supporting ring castings 27 is formed with a circumferentially spaced set of radially disposed slide bearings for respective bar-supporting stems 34, 34, each stem being formed at its outer end with a headed stud 35, Fig. 7, adapted to engage in a key hole slot 35ª formed in a channel iron 36 secured to and forming a backing for the respective winding-form bar 26, the channel iron 36 being adapted, by its own weight and that of the winding-form bar 26 which it carries, to maintain its engagement with the stud.

The radially-inner portion of the stem 34 is formed on one side with a set of oblique rack teeth 37 which are meshed with complementary oblique rack teeth, similar to those shown at 38 in Fig. 9, formed upon one side of the vertical rack bar 39 secured to and projecting downward from the bar-actuating ring casting 28. The vertical rack bar 39 is enclosed, below the ring casting 27, by a grease well 40 secured to said casting. The arrangement of the rack teeth formed on the stem 34 and the bar 39 is such that downward movement of the bar-supporting ring casting 27 with relation to the bar-actuating ring casting 28, at the beginning of the down stroke, will slide the stem 34, carrying the winding-form bar 26, radially outward, and downward movement of the bar-actuating ring casting 28 with relation to the bar-supporting ring casting 27, at the end of the down stroke, will effect a radial inward movement of the winding-form bar 26, withdrawing it from the wound fabric tube, 41, for the up stroke.

For similarly actuating the alternate winding-form bars 25, their supporting rods 21, which pass freely through the castings 27, have secured on them at intervals bar-supporting ring castings such as the one shown at 42, Fig. 9, and their actuating rods 24, which pass freely through the castings 27 and 28, have secured upon them, just above each of the ring castings 42, a bar-actuating ring casting 43, said ring castings being secured, upon the rods 21 and 24 respectively, in the same manner, and having the same type of rack connection with the winding form bars 25, as is described above with relation to the supporting rods 21, actuating rods 23 and winding-form bars 26, except that the stems 44 of the winding-form bars 25 have their rack teeth reversed in position as compared with the stems 34 of the bars 26, as is clearly shown in Fig. 16, the arrangement being such, nevertheless, that the winding-form bars 26 will be moved radially outward at the beginning of their down stroke and radially inward at the end of their down stroke, in the same manner as the alternate bars 26.

The ring castings 27 and 42 are formed with respective annular channels 27ª and 42ª which may be partially filled with grease for automatic lubrication of the oblique rack teeth 37, 38 and the slide bearings of the stems 34 and 44.

The ring castings 27, 28, and likewise the ring castings 42, 43, are not only adapted to be moved away from each other at the top and toward each other at the bottom of each stroke, to present and withdraw the winding-form bars radially with relation to the fabric tube, but are also adapted to be set at different distances apart initially, in order to vary the effective diameter of the winding form as a whole, to adapt it for the winding of fabric tubes of different diameters, the stems 34 and 44 being adapted to be moved radially inward and outward at each stroke in the manner above described although the strokes of the frame castings be varied, through variation of the initial spacing apart of the ring castings of each pair as described.

For varying such initial spacing of the ring castings, to change the diameter of the winding form, devices are provided at the upper ends of the actuating rods 23 and 24, which are adapted in effect to vary their length and thus to shift the range of movement of their frame-supporting portions without changing the length of such range. Said devices are shown clearly in Fig. 6, where it will be seen that the upper ends of the rods 23 are secured to respective arms of a spider 45 adapted to be adjusted from and toward a spider 46, the latter having secured to its respective arms upwardly extending rods 23ª constituting, in effect, continuations of the rods 23. The hubs of the spiders 45, 46 are formed with internal right-hand and left-hand threads respectively and are mounted upon respective end portions of a right-and-left threaded bushing 47 slidably mounted upon the arbor 10 and having at its middle a flange 48 formed with holes 49, 49 to receive a pry bar for turning the bushing 47 and thus adjusting the spiders 45 and 46 from or toward each other. The internally threaded hub of each of the spiders 44, 45 is longitudinally split at its outer end, as shown at 50, 50, and formed with an external taper thread to receive a taper-threaded nut 51, for securing the spider in adjustment.

Rods 24ª are adjustably secured in extension of the rods 24 by an adjustment device which is substantially like that just described for the rods 23, and which will consequently require no further description.

*Actuating means for mandrel structure.*

The supporting rods 21 of the ring castings 42, which support the set of winding-form bars 25, are secured at their tops, Figs. 1ᴬ and 2, to the respective arms of a three-armed spider 52 slidably mounted upon the upper portion of the guide post 14, and the extension rods 24ª of the rods 24, which actuate the winding-form bars 25, are secured at their tops to the respective arms of a three-armed spider 53, slidably mounted upon the guide post 14, just below the spider 52, its arms alternating with those of the spider 52 as viewed in plan. Similarly the supporting rods 22 of the ring castings 27, which support the winding-form bars 26, are secured at their upper ends to the respective arms of a three-armed spider 54 slidably mounted upon the lower portion of the guide post 14, its arms being vertically aligned with the arms of the spider 53 and apertured to accommodate the extension rods 24ª, as shown clearly in Fig. 3. The extension rods 23ª of the rods 23, which actuate the winding-form bars 25, are secured at their tops to the respective arms of a three-armed spider 55, slidably mounted upon the guide post 14, just above the spider 54, said extension rods 23ª extending downward along the supporting rods 21 as shown clearly in Fig. 3.

The actuating means for the mandrel structure is such as to give each set of winding-form bars a relatively slow downward stroke of uniform speed, with the bars engaging the fabric, and to give them a more rapid up stroke, with the bars disengaged from the fabric, in order that each set of bars may engage the fabric and start downward before the other set of bars completes its fabric-engaging downward stroke, thus providing a continuous internal support and downward feed of the fabric at uniform speed. As the upward and downward movement of the winding form bars is controlled entirely by the spiders 52 and 54, the construction will be best understood by first considering the movement of these two bar-supporting spiders without reference to the relative movements of the bar-actuating spiders 53 and 55, which effect the radially inward and outward movement of the respective sets of winding form bars.

The bar-supporting spider 52 is connected, by a pair of upwardly-extending lifting links 56, 56 (see Fig. 5), with respective lever arms 57, 57 straddling the upper portion of the guide post 14, and formed with interlocking hubs, as shown in Fig. 4, loosely fulcrumed upon a shaft 58 which is journaled in a pair of brackets 59, 59, formed upon the frame 16. Formed integrally with the respective lever arms 57 are two downwardly-extending, axially-offset lever arms 60, 61, their lower end portions being curved toward each other and provided with respective cam rollers 62, 63 (Fig. 2) adapted to run upon the peripheries of respective cams 64, 65 secured upon a shaft 66 journaled in a pair of brackets 67, 67 (Figs. 2 and 4) formed upon the frame 16, the cams 64, 65 being so formed as to effect a relatively slow and uniform downward movement of the spider 52 and a relatively quick upward movement of said spider at each revolution of the shaft 66, the latter being adapted to be driven at uniform speed, clockwise as viewed in Fig. 2, by a sprocket 68 secured thereon and having a sprocket chain 69 running to a reduction-gear device 70 connected with a motor 71 (Fig. 1ᴬ).

The lower bar-supporting spider 54 is connected, by a pair of downwardly extending lifting links 72, 72, (see Fig. 5), with respective lever arms 73, 73 formed with interlocking hubs (see Fig. 4) loosely fulcrumed upon a shaft 74, journaled in a pair of base brackets 75, 75, and formed integrally with the respective lever arms 73, 73 are two upwardly-extending, axially-offset lever arms 76, 77 their upper end portions being curved toward each other and provided with respective cam rollers 78, 79, adapted to run upon the peripheral faces of the cams 65 and 64 respectively, so that said cams are adapted to effect a relatively slow downward movement of the spider 54 at a uniform speed and a relatively quick upward movement thereof, at each revolution of the shaft 66.

For raising the bar actuating spider 53 with relation to the bar supporting spider 52, at the beginning of each downward stroke, and lowering it with relation to the spider 52 at the end of each downward stroke, said spider 53 is connected, by a pair of upwardly-extending lifting links 80, 80 (see Fig. 5), with respective lever arms 81, 82 secured upon a shaft 83 extending between and rotatably mounted in the middle parts of the two lever arms 57, the lever arm 82 being formed integrally with an oppositely extending lever arm formed as a pair of forks 84, 85, said forks being provided at their ends with respective cam rollers 86, 87 embracing and adapted to run upon the peripheral face of a cam 88 secured upon the shaft 58 and adapted to be oscillated, to raise and lower the lever arm 82 with relation to the lever arms 57, in timed relation to the ascending and descending movement of the latter. For so oscillating the cam 88 the shaft 58 has secured thereon a rocker-arm 89 having a connecting rod 90 running to a crank 91 secured upon the constantly driven shaft 66, said crank 91 being of shorter length than the rocker-arm 89 so that the latter is only oscillated as the crank 91 revolves.

For similarly raising and lowering the bar-actuating spider 55 with relation to the bar-supporting spider 54, the spider 55 is connected by the pair of downwardly extending lifting links 92, 92 (see Fig. 5) with a pair of lever arms 93, 94 secured upon a shaft 95 extending between and rotatably mounted in the middle portions of the lever arms 73, the lever arm 94 being formed integrally with an oppositely extending lever arm formed as a pair of forks 96, 97 provided at their ends with respective cam rollers 98, 99 embracing and adapted to run upon the periphery of a cam 100 secured upon the shaft 74 and adapted to be oscillated to raise and lower the lever arm 96 and 97, the shaft 74 being provided with a rocker arm 101 having a connecting rod 102 running to the crank 91.

In Fig. 2 the slides 52 and 53 are shown as moving downward together, the actuating slide 53 being lifted with relation to the supporting slide 52 in order to hold the corresponding set of winding-form bars radially outward, and the slides 54 and 55 are shown as rising together, the actuating slide 55 being in its lowermost position with relation to the supporting slide 54 in order to hold the corresponding set of winding-form bars radially inward. The oscillating cam 88 is so formed and mounted with relation to the mounting of its cam rollers 86, 87 that the upper pivotal connections of the spider-supporting links 56 and 80 are moved into axial alignment at 103, Fig. 2, at the beginning of the downward stroke, when the spider 53 reaches its position closest to the spider 52, so as to avoid relative vertical movement of the spiders 52 and 53 during the effective part of such descending stroke. Similarly the oscillating cam 100 is so formed and positioned with relation to its rollers 98 and 99 as to produce a like effect with relation to the spiders 54, 55 during the descending stroke, the lever arms 82 being adapted to move out of alignment with the lever arms 57, and the lever arms 94 being adapted to move out of alignment with the lever arms 73, only at the end of each descending stroke of the respective pair of spiders.

For externally engaging the fabric tube 41 as it passes downward on the lower end portion of the mandrel structure, to support the mandrel structure laterally against the force of the fabric winding means, an annular casting 104, Figs. 1ᴮ, 10 and 11, is fitted in the aperture in the floor F through which the mandrel structure extends, and is formed with a radial end flange abutting the under side of said floor and secured thereto by screws 105, 105, Fig. 11, said flange being formed with circumferentially spaced, radially disposed guides 106, 106 for respective slides 107, 107 each formed at its radially inner end as a bearing fork for a pair of arcuately flared rollers 108, 108 adapted to run upon the fabric tube 41. An adjusting screw 109 having a squared outer end to receive a wrench is swiveled in a bracket 110 on the casting 104 and threaded through a nut 111 mounted between apertured lugs 112, 112 formed on the slide 107, for adjusting each of the several slides from and toward the work to position the rollers 108 accurately for fabric tubes of different diameters.

*Fabric winding devices.*

The fabric supply carriage J and its turn-table or winder-ring H, upon the floor E, Figs. 1ᴬ, 18, 20 and 25, are substantially like the supply carriage K and its turn-table or winder-ring I, upon the floor F, Fig. 1ᴮ, except that they are adapted to carry their respective supplies of fabric around the mandrel structure in opposite directions, and the same description with the same reference numerals, so far as applicable, will be applied to the two in common.

The winder-ring H or I is provided with a ball-bearing 113, Figs. 10 and 18, surrounding the aperture in the floor through which the mandrel structure extends and at points nearer its outer periphery is provided with circumferentially spaced wheels such as that shown at 114, Figs. 1^A and 1^B, and 18, running upon a circular floor rail 114^a. Secured to the under side of the winder-ring, about its ball-bearing 113, is a gear 115 meshed with a bull pinion 116 secured upon a shaft 117 which is journaled in and extends downward through a suitable bearing mounted in the floor E or F, the projecting lower end of the shaft 117 having secured thereon a worm gear 118 or 119, the worm gear 118 for the winder-ring H being oppositely pitched as compared with the worm gear 119 for the winder-ring I, so that the winder-rings H and I are adapted to be driven in opposite direction by respective oppositely pitched worms meshed with the respective worm gears 118 and 119. The worm for the gear 118 or 119 has driving connection, through a line of shafting including universal joints 120, 120 and a shaft 121, with a variable speed drive device 122 or 122^a of the Reeves type, said device being secured to the under side of the floor E or F and being adapted to be driven through a shaft 123 and beveled gears 124, 124 from a vertical shaft 125 extending downward through the floors D, E and F and provided at its upper end, above the floor D, with a bevel gear 126 meshed with a bevel gear 127 secured upon a horizontal shaft 128 having driving connection with the motor 71, each of the variable speed devices 122 being adapted to be adjusted, by an operator standing upon the winder-ring, through a suitable electrical extension control which will be hereinafter described.

The fabric supply carriage J or K comprises a frame on the top of which is journaled a fabric guiding drum 132, hereinafter described more in detail, having its axis lying approximately in a vertical, radial plane, with respect to the orbit of the winder, but tilted downward at its outer end, preferably at an angle of about 22½° from horizontal, for the production of the usual types of tire bands, so as to guide the fabric web smoothly onto the mandrel structure with a helical pitch of about 45°, means being provided for guiding the fabric web vertically onto the guiding drum 132. The guide drum is preferably so positioned that a plane obliquely tangent to the fabric-receiving side of the winding form will also be approximately tangent to the delivery side of the guide drum, so that the intervening reach of fabric may be tensioned evenly throughout its width.

The fabric-supplying and feeding means comprises a stock roll 133 journaled in suitable brackets upon the base of the carriage J or K, said stock roll being provided with a tension brake 134 (see Fig. 20) to give off, under tension, the fabric web B^1 or C^1 with its liner 135. A guide roll 136 is journaled in suitable brackets mounted upon the base of the frame and is adapted to guide the fabric web to a pair of driven, spaced-apart feed rolls 137, 138, the web passing partly around each of said rolls. From the feed roll 138, the fabric passes over a loosely journaled guide roll 139 and through a storage loop 140 provided with a floating roll 141, having its journals slidably and rotatably mounted in vertical slots such as the slots 142 formed in vertical members of the frame, and from said storage loop the fabric passes vertically to the guide-drum 132.

For maintaining the storage loop 140 at a suitable length within the range of movement of the floating roller 141, one of the journals of the latter has rotatably mounted thereon a collar 141^a (Fig. 18) which is connected, through a cable 141^b running over suitable guide pulleys 141^c, 141^d mounted upon the carriage frame, with the control lever 141^e (Figs. 18 and 25) of a variable speed drive device 149 through which the fabric feeding rolls 137 and 138 are driven, said control lever 141^e being connected with a weight 141^f for moving it in the opposite direction and the fabric feeding device being thus adapted to supply the fabric to the guide drum 132 with substantially uniform tension as determined by the weight of the floating roll 141.

For withdrawing the liner 135 from the fabric web B^1 or C^1 as the latter passes from the guide roll 136 to the feed roll 137, a liner rewinding roll 143 is journaled upon the frame and adapted to be frictionally driven through a sprocket chain 144 running from a sprocket secured upon the shaft 145 of the feed roll 137, said shaft 145 having constant driving connection, through a speed reduction gear 146, (Fig. 20) sprocket chains 147 and 148 (Figs. 18, 20 and 25), the variable speed drive device 149 and a sprocket chain 150, with a motor 151 mounted upon the frame and adapted to be supplied with electric energy through electrical connections hereinafter described.

In order that the liner-rewinding roll 143 may be driven independently of the web feeding rolls 137, 138, in starting the liner upon the rewinding roll when each new stock-roll of fabric is mounted, for example, the feed roll 137 is loosely journaled upon its shaft 145 and has secured to one of its ends a gear 154 meshed with a similar gear 155 secured to the adjacent end of the roll 138 (see Fig. 20), the roll 138 being loosely journaled upon a shaft 156 non-rotatably secured in the frame (see Figs. 19 and 20). At their other ends the rolls 137 and 138 are provided with a jaw clutch member 157 and female cone clutch member 158 respectively, the jaw clutch member 157 being adapted to mate with a clutch member 159 slidably and non-rotatably mounted upon the shaft 145, for driving the rolls 137 and 138 when it is engaged, and the female cone clutch member 158 being adapted to mate with a clutch member 160 slidably and non-rotatably mounted upon the fixed shaft 156 (see Fig. 19), for holding the rolls 137 and 138 against rotation at such times as the jaw clutch 157, 159 in disengaged. For disengaging clutch 158, 160 when the clutch 157, 159 is engaged, and vice versa, a double-acting shipper lever 161 is fulcrumed upon the frame at 162, one arm of said lever being adapted to actuate the clutch member 160 and the other arm thereof being adapted to actuate simultaneously the clutch member 159 in the opposite direction.

The friction drive device for the liner-rewinding roll 143 (see Fig. 21) comprises a chuck-spindle 170 formed with a notched hub 171 carrying a common type of slip-collar 171ª and latching stud 171ᵇ, said chuck-spindle being adapted to receive one end of the squared roll bar 172 and secure the same against relative rotation, said chuck-spindle 170 being journaled in a bearing bracket 173 projecting from the frame of the carriage, the bearing portion of said bracket extending along the spindle 170 and being formed with an external thread upon which is mounted a hand wheel 174 formed with an internally threaded hub and adapted to be turned upon the threaded portion of the bracket to adjust the pressure upon a pair of friction washers 175, 175 clamped between the hub of the sprocket, 176, through which the liner roll is driven, and a pair of clamping collars 177, 177, the latter being slidably keyed upon the spindle 170, and the sprocket 176 being secured against relative rotation upon the spindle only by the friction washers 175. A roller thrust-bearing 178 is interposed between the hand wheel 174 and the collar 177, and a similar roller thrust-bearing 179 is interposed between the head of the chuck-spindle 170 and bearing bracket 173, in order that tightening of the collars 177 against the friction washers 175 may not unduly brake the rotation of the shaft 170.

The fabric-guiding drum 132, disposed obliquely as above described, is loosely journaled upon a shaft 180 secured in the frame of the fabric-supply carriage. When an ordinary cylindrical guide roll is employed in a similar situation the oblique position of the roll's axis with relation to the approaching reach of fabric results in a tendency of the fabric to "climb" or progress longitudinally of the guide roll, toward the end thereof nearest to the approaching fabric, and as this tendency can be overcome only by slippage of the fabric upon the guide roll, uneven tensioning and inaccurate guiding of the fabric is likely to result. The guide drum 132 here shown is so designed as to avoid these objectionable features and provide an even tensioning and accurate guiding of the fabric.

Said drum comprises a hub member 181, from which extend radial, circumferentially spaced pairs of spoke members 182, 182 (see Figs. 22 and 23), each of said spoke members being provided with a pair of grooved supporting rollers 183, 183 journaled on tangential axes, and a pair of flared retaining rollers 184, 184, journaled on radial axes, for a pair of cylindrical rails 185, 185 secured by brackets 186, 186 to the inner side of a face bar 187, the several bars 187 providing substantially a continuous, cylindrical facing for the guide drum. Each of said bars is adapted to be driven back and forth, longitudinally with relation to the hub member 181, as the drum is rotated by the fabric, in such manner as to move toward the winding-form while engaging the fabric, and away from the winding form while out of contact with the fabric, so as to guide the fabric from its vertical course to its oblique course without substantial relative movement of the fabric upon the bars, instead of urging it to pass directly around the drum circumferentially and thus requiring it to slip longitudinally of the drum in order to follow its proper new course, as occurs in the case of a solid guide roll positioned obliquely with relation to the strip.

For so running the arms 187 longitudinally of the drum, each bar is provided at one end with an inwardly projecting stud roller 188 running in a cam groove 189 formed on the exterior of a stationary cam drum 190 which surrounds the shaft 180 and is secured by bolts 191, 191 to the frame of the carriage.

In order that the angular position of the guide drum with relation to the winding form may be varied, to adjust it in accordance with the pitch of the winding, the carriage is supported upon the winder ring by four grooved rollers 389, 389, 390, 390, journaled upon the latter and engaging oblique tread faces of feet 391, 391, 392, 392. (Figs. 18 and 20) with which the carriage is provided, said oblique faces being disposed approximately radially with relation to the winder's orbit and tangentially with relation to the center of the guide drum, so that the carriage may be tilted from and toward the winding form, by angular displacement of its base about the guide drum as a center.

For so adjusting the carriage, oblique faced brackets 393, 393 secured to the carriage at its inner side adjacent the respective feet 392 are formed with rack teeth upon their oblique faces, meshed with respective pinions 394, 394 secured upon a common shaft 395 which is provided with driving means including a band wheel 396 mounted on the carriage.

Band severing device.

Screwed upon the lower end of the arbor 10, below the lowermost position of the winding form bars 25, 26, is a flanged collar 195, Fig. 13, to the under face of which is attached a spider 196 having downwardly and outwardly extending arms 197, 197. Surrounding and attached to said arms is a downwardly flared, annular internal guide member 198 for the fabric tube 41 (see Figs. 12 and 13), and mounted in a radial slide-bearing formed in the lower end of each of the arms 197 is a cam actuated plunger 199 formed at its outer end with an arcuate head 200, the several heads having mounted thereon in common an annular rubber pad 201 adapted to be expanded and thus forced momentarily against the inner face of the fabric tube 41 to hold the adjacent portion of the latter stationary for the severing operation, said rubber pad being formed with a circumferential groove 202 to accommodate the severing knives as the latter project inwardly through the wall of the tube.

The inner end of each plunger 199 is provided with a cam roller 203, the several said cam rollers being adapted to run upon the conical outer face of a downwardly flared cam member 204 secured upon the lower end of an axial bar 205 extending upward through the apertured hub of the spider 196 and constituting the core for a solenoid 206 having supply wires 358 running up through the arbor 10 and guide post 14. The cam member 204 is thus adapted to be momentarily lifted, at intervals determined by contact of the bottom edge of the fabric 41 with a trigger 207 to force outward the plungers 199 for successive band severing operations, so as to provide tire bands of appropriate width. The elastic rubber pad 201 is adapted to return the plungers 199 inward as the cam member 204 is lowered after each cutting operation.

The knife-manipulating mechanism comprises a floor bracket 215 supporting a hollow, annular housing 216 surrounding the fabric tube 41 at the severing position, said housing including a pair of annular abutment members 217, 217 having their inner margins spaced apart to permit the passage of the knives and being adapted to be engaged by the outer face of the fabric tube as the latter is expanded by the stretched rubber ring 201, so that the fabric is clamped between said ring and said abutment members for the severing operation.

Mounted upon a roller bearing 218 within the annular housing 216 is a knife-carrying ring 219 formed on its outer periphery with a set of gear teeth meshed with a drive pinion 220 secured upon the upper end of a vertical shaft 221 which has driving connection with a motor 222, the knife-carrying ring 219 thus being adapted to be continuously driven, counter-clockwise as viewed in Fig. 12. A set of circumferentially spaced knives 223, 223, preferably curved forward at their points as shown, are mounted upon the ring 219, each knife being clamped in a squared plunger 224 mounted in a radial slot extending across said ring, the upper face of each plunger being flush with the upper face of the ring. Projecting from the upper face of each plunger 224 is a cam stud 225, engaged in an oblique cam slot 226 formed in a brake ring 227 rotatably mounted upon the knife-holding ring 219 and held in concentric relation thereto by a ball bearing 228 interposed between the brake ring and the upper member of the annular housing, the cam slots 226 being so disposed in the brake ring 227 that retardation of the latter with relation to the rotation of the knife-holding ring 219 will result in the knives 223 being projected radially inward to engage the fabric tube 41, and acceleration of the brake ring with relation to the knife-holding ring will effect withdrawal of the knives radially outward. Pull springs such as the one shown at 229, Figs. 14 and 15, are so interposed between the two rings, in suitable recesses formed in the adjacent faces of the latter, as to urge the brake ring forward upon the knife-holding ring, to the limit of relative movement permitted by the cam slots 226, normally to hold the knives radially outward away from the work, and for momentarily retarding the brake ring 227 at timed intervals, against the force of said springs, to cause the knives to move radially inward and sever the fabric tube, a set of circumferentially-spaced brake-shoes 230, 230, adapted to act against the outer face of the brake ring 227, are secured upon respective plungers 231, 231 mounted in radial apertures formed in the outer wall of the housing 216 and constituting the cores of respective solenoids 232, 232.

Electric drive and controls.

Referring especially to the electric diagrams of Figs. 26 to 32, the motor 71 on floor D, which, through the respective variable speed devices 122 drive the winder ring H on floor E, the winder ring I on floor F, and which through the sprocket chain 69, Fig. 2, also drives the intercalated bars of the mandrel structure, is preferably a 3-phase slip-ring induction motor and is connected by the usual stator connections 250, and rotor connections 251, with a 3-pole automatic starting switch 252 (Fig. 31) which has connection through a 3-pole fused safety switch 253 and connectors 254 with the power lines 255.

The fabric-driving motor 151 mounted upon the carriage J on floor E is preferably a 3-phase squirrel-cage induction motor and is connected through connections 256 Fig. 29, an automatic across-the-line switch 257, a fused safety switch 258, connections 259, trolley rails 260, connections 261 (Fig. 30) and a 3-pole fused safety switch 262 (Fig. 29) with the power lines 255.

Similarly the fabric-driving motor of the carriage K on floor F, represented at 263 in Fig. 30, is connected, through connections 264, an automatic across-the-line switch 265, a fused safety switch 266, connections 267, trolley rails 268, connections 269 (Fig. 31) and a 3-pole fused safety switch 270 (Fig. 30), with the power lines 255.

For adjusting the variable speed device 122 (Fig. 1ᴬ) which drives the winder ring H on floor E, a 3-phase squirrel-cage induction motor 271 is mounted upon the frame of the device 122 and has suitable worm-connection with the control lever of the said device as to vary the speed ratio thereof. Said motor has connection to the power lines 255 through connectors 272 (Fig. 30), a 3-pole fused safety switch 273, connections 274, an automatic across-the-line switch 275 (Fig. 29) and a 3-pole fused safety switch 276.

A motor 277 (Fig. 1ᴮ) is similarly provided for adjusting the variable speed device 122ᵃ which drives the winder ring I on floor F, said motor having connection with the power lines 255 through connections 278 (Fig. 31) a 3-pole fused safety switch 279, connections 280, an automatic across-the-line switch 281 (Fig. 30) and a 3-pole fused safety switch 282.

The motor 222 (Figs. 1ᴮ, 13 and 32) for driving the knife-carrying ring 219 is preferably a 3-phase squirrel-cage induction motor and has connection with the power lines through connections 283 (Figs. 32 and 31), a 4-pole, automatic, across-the-line switch 284, controlling two of said connections, a 3-pole fused safety switch 285, and connections 286.

The control circuit for the mandrel-driving and winder-driving motor 71 on floor D (Figs. 1ᴬ and 28), running from the 3-pole automatic starting switch 252, includes two connections 287 leading to a standard three-wire, start-and-stop, push button switch 288, mounted upon a switchboard 400, Fig. 1ᴮ, and from said switch 288 the third or stop-circuit connection 289 runs through a push-button stop switch 290 (Figs. 1ᴮ and 32), mounted upon the supporting frame of the severing device M, (Figs. 1ᴮ and 32) and a push-button stop-switch 291 (Fig. 28) located adjacent the mandrel-driving mechanism on floor D, and returns to the starting panel 252 through a series of relay switches 292, 293, 294, 295 (Fig. 31) adapted to be actuated by the control circuits, hereinafter described, of other devices of the system.

A circuit 296 leading from the starting panel 252 is adapted to furnish current to a signal lamp 297 (Fig. 31) when the circuit of the main drive motor 71 is open.

The control circuit for the fabric-driving motor 151 on floor E (Figs. 1ᴬ, 20 and 29) running from the automatic across-the-line switch 257 is a two-wire control circuit 298 running through a single disk, start and stop push-button switch 299 (see Figs. 18 and 29) and a limit switch 300 (see Figs. 20 and 29), both mounted on the carriage J, the limit switch 300 being adapted to be held open by contact of one of the trunnions of the floating roll 141 when the fabric loop 140 acquires a determinate length.

A remote control for the mandrel-driving and winder-driving motor 71 is adapted to be actuated, by an operator and also automatically, from the carriage J on floor E, said remote control including a single-phase A. C. circuit 301 (Fig. 29) running from the 3-pole fused safety switch 258 to a 3-pole across-the-line switch 302 adapted to control suitable signal lights 303 and 304 and also, through D. C. connections 305, trolley rails 306, connections 307, a two-pole fused safety switch 308, and connections 309, to control the relay switch 292, Fig. 31), the circuit of said connections 309 and of the coil of said relay switch including D. C. supply connections 310 leading from a circuit breaker 311 connecting with D. C. power feed lines 312. A limit switch 313 (Figs. 20 and 29) adapted to be opened by the trunnion of the floating roll 141 at approximately the uppermost position of the latter is interposed in a control circuit 314 adapted to open the 3-pole across-the-line switch 302, thereby opening the relay switch 292 and so stopping the motor 71, said circuit 314 also including a 3-wire, two-button start-and-stop switch 315 (see Figs. 1ᴬ, 18 and 29).

For controlling the reversible squirrel-cage motor 271 to adjust the variable speed device 122 of the winder H, a two button, spring opened switch 316 (Figs. 1ᴬ, 18 and 29) is mounted upon the carriage J and is interposed in a three-wire control circuit 317 running to the across-the-line switch 275 (Fig. 29) through trolley rails 318 and connections 319 (Figs. 29 and 30), the said motor 271 being adapted to be driven in one direction or the other while one or the other button of the switch 316 is held depressed, to vary the adjustment of the variable speed device 122 and thereby to increase or retard the speed of the winder H.

The control circuit for the fabric driving motor 263 on floor F, Fig. 30, running from the automatic across-the-line switch 265 is a 2-wire control circuit 320 running through a single disk start-and-stop push-button switch 321 and a limit switch 322, both mounted on the carriage K, and the limit switch 322 being adapted to be opened by contact of one of the trunnions of the floating roll 141 of the carriage K when the fabric loop acquires a determinate length.

A similar remote control for the mandrel driving and winder motor 71 is adapted to be actuated, by an operator and also automatically, from the carriage K on floor F, said limit control including a single A. C. circuit 323, Fig. 30, running from the 3-pole fused safety switch 266 to a 3-pole across-the-line switch 324 adapted to control suitable signal lights 325 and 326 and also, through D. C. connections 327, trolley rails 328, connections 329, a 2-pole fused safety switch 330 and connections 331 to control the relay switch 293 Fig. 31, the circuit of said connections 331 and of the coil of said relay switch including D. C. supply connections 332 connecting, through the supply wires 310, with the circuit breaker 311. A limit switch 333, Fig. 30, adapted to be opened by the trunnion of the floating roll 141 of the carriage K at approximately the uppermost position of the latter, is interposed in a control circuit 334 adapted to open the 3-pole across-the-line switch 324, thereby opening the relay switch 293 and so stopping the motor 71, said circuit 334 also including a 3-wire, 2-button start-and-stop switch 335.

For controlling the reversible squirrel-cage motor 277 to adjust the variable speed device 122$^a$ of the winder I, a 2-button spring-opened switch 336 is mounted upon the carriage K and is interposed in a 3-wire control circuit 337 running to the across-the-line switch 281 through trolley rails 338 and connections 339, the said motor 277 being adapted to be driven in one direction or the other while one or the other button of the switch 336 is held depressed, to vary the adjustment of the variable speed device 122$^a$ and thereby to increase or retard the speed of the winder I.

The control for the motor 222 which drives the knife carrying ring 219 comprises a three-wire, two-button switch 340 mounted on the switchboard 400 (Figs. 1$^B$ and 31) and adapted to control the 4-pole automatic across-the-line switch 284, through connections 341. Running from and controlled by the switch 284 are D. C. connections 342 which together with connections 343 from the D. C. supply lines 310 constitutes the operating circuit of the relay switch 294.

The knife-actuating trigger 207 (Figs. 1$^B$, 13 and 26), projects from and is adapted to effect successive, momentary closings of a normally open ratchet switch 344 adjustably mounted upon the severing device M and interposed in a D. C. control circuit for a three-pole contactor 346, one connector 345 thereof running from one brush of said ratchet switch to one line of the D. C. supply circuit 310, adjacent the circuit breaker 311, and the other connection thereof, 347, running from the other brush, through one pole of the A. C.-actuated across-the-line switch 284 and through the operating coil 348 of the 3-pole D. C. contactor 346, to the other line of the D. C. supply circuit 310, adjacent the circuit breaker 311, the arrangement being such that closing of the contactor 346 first energizes the solenoid 206 to raise the cam 204 (Fig. 13) to clamp the fabric tube 41, and then energizes the solenoids 232 (Figs. 12 and 13) to apply the brakes 230 and thereby cause the ring 219 to be retarded and momentarily hold the knives 223 in tube-severing position. To provide a brief time interval between the clamping action of the cam 204 and the inward movement of the knives 223, the clamp-actuating contacts 349 and 350 of the contactor 346 (Fig. 31) are, in open position, more closely spaced than are the knife-actuating contacts 351 and 352, and a dash-pot 353 is provided to retard the actuation of the contactor. To delay the reopening of the contactor 346 and thereby to keep the solenoids 206 and 232 energized for a sufficient time to effect the severing of the fabric tube 41, an adjustable time-limit relay 354, having a dash-pot 355, is provided, the operating coil of said time-limit relay being arranged in parallel with the circuit which supplies current to the solenoids 232. Said solenoid-supplying circuit comprises connections 356 (Figs. 31 and 32) to which the solenoids 232 are connected in parallel by connections 357, 357. The circuit of the clamping solenoid 206, which is adapted to be closed by the contacts 349, 350, comprises connections 358 running upward from the said solenoid, through the hollow arbor 10 of the mandrel structure and the hollow guide post 14, and thence, through the said contacts 349, 350, of the contactor 346, to the D. C. supply.

Signal lamps 359, 360, 361 and 362 are connected by respective connections 359$^a$, 360$^a$, 361$^a$ and 362$^a$ with the relay switches 292, 293, 294 and 295 respectively and are adapted to light when the latter are closed.

*Operation.*

The machine is controlled by three operators, one being stationed at the switch board 400 (Fig. 1$^B$) upon the floor L adjacent the cut-off device, another upon the winder H on floor E, and the third upon the winder I on floor F. A fourth operator may be stationed upon floor D to oversee the mandrel driving mechanism.

Assuming that the machine has been threaded and is ready to operate, and that all switches are open, each operator closes his safety switches and floor L operator closes the D. C. circuit breaker 311. The "run" signal 362 (Fig. 31) is thereby given, through the closing of relay switch 295. The floor L operator then starts the fabric cut-off motor 222 by closing push-button switch 340, which closes the automatic switch 284. The "run" signal 361 is thereby given through the closing of relay switch 294.

The L floor operator is then unable to proceed further until "run" signals 360 and 359 are thrown on by the floor F operator and the floor E operator respectively, which is then effected by the closing of push-button switches 335 and 315. This causes the relay switches 293 and 292 (Fig. 31) to close, preparing the control circuit which includes the lines 289 to be finally closed, so that, through the starting switch 252 and connections 250 and 251 current may be supplied to the mandrel-driving and winder-driving motor, which is then effected by the closing of switch 288 by the floor L operator. "Run" signals 326 and 304 (Figs. 30 and 29) are lighted by the closing of switches 335 and 315 and serve as constant reminders to the respective winder operators that they have closed their respective relay switches 293 and 292 and that, in case the floor L operator has not closed the relays 295 and 294 and the switch 288, that he may do so and thereby start the winder and mandrel at any time. At the same time that they close the switches 335 and 315 respectively, the floor F operator and the floor E operator close switches 321 and 299 respectively, and, as soon as the respective fabric loops 140 so shorten, as the result of the drawing of fabric onto the mandrel structure, as to lift the floating rolls 141 from the limit switches 322 and 300, allowing them to close, the fabric-feeding motors 263 and 151 are energized through the connections 269 and 261 respectively.

Opening of the normally closed contacts of push-button switch 335 (Fig. 30) or 315 (Fig. 29), may be employed at the will of the operator to stop the mandrel-driving and winder-driving motor 71 or to prevent it from starting.

During the operation of the machines the winder operators so control the speed ratios of the variable speed devices, 122 and 122$^a$, by driving the motor 271 or 277 in one direction or the other by means of the push-button switch 336 or 316, the current being on the motor only while the switch is held closed, and the winder operators thus cause the successive turns of fabric on the mandrel structure substantially to abut or slightly to overlap each other, and by means of the hand wheel such as the hand wheel 396 they so vary the tilt of the respective carriages as to adjust the fabric guiding drum, such as the drum 132, to conform to the relative speed of the winder and consequent pitch of the winding.

The downwardly fed fabric tube 41 actuates the trigger 207 and thereby causes successive endless bands to be severed therefrom by the severing devices and automatic controls described, the trigger rising being lifted by the spring 207$^a$, after each severing operation to be again actuated for the severance of the next band.

As will be clearly apparent upon reference to Fig. 1$^A$ the driving members or bars 25 are so actuated as to feed the tubular structure forward by movements of less length than the zone of their driving engagement with the structure, which permits the structure to be fed from the delivery end of the freely projecting assembly and at the same time the maintenance of a winding-form structure of longitudinally stiff form members and of suitable length to receive the helical winding of the wide web of fabric.

Stopping of the machine can be effected at any time by means of any one of the manually operated switches 290, 291, 288, 335, and 315, the fabric feeding motors being automatically stopped by the limit switches 322 and 300, respectively, following the stopping of the winders, and in case either of the fabric storage loops 140 becomes excessively short the upper limit switch 333 or 313 is opened by contact of the journal of the floating roll 141 and the mandrel driving and winder-driving motor 71 is thereby automatically stopped.

Advantages of the machine, including those set out in the above statement of objects, will be manifest from the foregoing description.

Various modifications may be resorted to within the scope of our invention, and we do not wholly limit our claims to the specific procedure or construction described.

We claim:

1. The method of producing a tubular structure which comprises progressively forming said structure at a determinate position while feeding the formed tubular structure from said position by local, internal, driving engagement therewith, the driving members being so moved as to engage and disengage the tubular structure and feed it forward by movements of less length than the zone of their driving engagement with the structure.

2. The method of making endless bands which comprises progressively forming a tubular structure of band-forming material at a determinate position while continuously feeding the formed structure from said position, and periodically stopping the forward portion of said structure and severing an endless band therefrom without stopping the continuous feed thereof at the forming position.

3. The method of making endless bands which comprises progressively forming a tubular structure at a forming position while continuously feeding the formed tubular structure from said position by local, internal, driving engagement therewith, and severing said structure transversely into endless bands while it is thus continuously fed, the driving members being so moved as to engage and disengage the tubular structure and feed it forward by movements of less length than the zone of their driving engagement with the structure.

4. The method of making endless tirebands which comprises helically winding band-forming material onto a winding-form so as to produce a tubular structure of the material thereon while feeding the wound tubular structure from winding position and manually controlling the positioning of successive convolutions of said material on said form, and severing the wound tubular structure transversely into endless tire-bands.

5. The method of producing a tubular structure of flexible material which comprises helically winding a web of said material onto a winding-form so as to form a tubular structure of the material on said form while feeding the wound tubular structure from winding position and controlling the positioning of successive convolutions of the material by varying, during the winding operation, the relative speed with which it is carried about the winding form.

6. The method of producing a tubular structure which comprises helically winding a web of material onto a winding-form so as to produce a tubular structure of the material thereon while feeding the wound tubular structure from winding position and controlling the positioning of successive convolutions of said material on said form by varying, during the winding operation, the relative speed at which it is carried about the winding form and correspondingly varying the position of the hold-back engagement of the on-running reach of the web so as to cause it to pass onto the winding form under substantially even tension through its width.

7. The method of making endless tirebands which comprises helically winding band-forming material onto a winding-form so as to produce a tubular structure of the material thereon while feeding the wound tubular structure from winding position at substantially constant speed and manually controlling the positioning of successive convolutions of the material by varying the speed of the winding, and severing the wound tubular structure into endless bands.

8. Apparatus for producing a tubular structure, said apparatus comprising means for progressively forming said structure at a determinate position and driving means for said structure adapted to feed it from said position by local, internal engagement therewith adjacent said position, the said driving means comprising members so constructed and arranged as to engage and disengage the tubular structure and feed it forward by movements of less length than the zone of their driving engagement with the structure.

9. Apparatus for making endless bands of flexible material, said apparatus comprising means for progressively forming a tubular structure of said material at a determinate position, means for continuously feeding the formed structure from said position as it is formed, and means for periodically stopping the forward portion of said structure and severing an endless band therefrom without stopping the continuous feed thereof at the forming position.

10. Apparatus for making endless bands, said apparatus comprising a ring-type winder, means for internally supporting and continuously feeding from said winder a helically wound, tubular structure of tireband material formed thereon by said winder, and means for transversely severing said tubular structure at a determinate position and in timed relation to its feeding movement, to form endless bands of determinate width.

11. Apparatus as defined in claim 10 in which the severing means is provided with a contact member adapted to be abutted by the leading end of the tubular structure to actuate said severing means.

12. Apparatus for making endless bands, said apparatus comprising a projecting mandrel structure including driving means for engaging the inner face of a tubular structure of band-forming material and thus feeding it from the projecting end of said mandrel structure, means for helically winding band-forming material onto said mandrel to form a tubular structure thereon, and means for severing the tubular structure transversely into endless bands as it is thus fed from said mandrel structure.

13. Apparatus for making endless bands, said apparatus comprising a projecting mandrel structure including driving means for engaging the inner face of a tubular structure of band-forming material and thus feeding it from the projecting end of said mandrel structure, means for helically winding band-forming material onto said mandrel structure to form a tubular structure thereon, means for severing the tubular structure transversely into endless bands as it is thus fed from said mandrel structure, and internal means for holding said tubular structure to circular cross-sectional form while it is thus severed.

14. Apparatus for producing a tubular structure, said apparatus comprising a winder, a mandrel structure adapted to receive a helical winding of material from said winder and propel it continuously therefrom, driving means operatively connecting said winder and said mandrel structure, and means subject to manual control of the operator for varying the speed ratio of said driving means during the winding operation so as to vary the relative speeds of the winder and the mandrel structure.

15. Apparatus for producing a tubular structure, said apparatus comprising a mandrel structure adapted to receive a helical winding of material as a continuous tubular structure thereon and to propel the same continuously from winding position as it is formed, a winder adapted to wind the material upon said mandrel structure, means for driving said mandrel structure and said winder at different relative speeds, to cause successive convolutions of the wound material substantially to engage each other at their margins notwithstanding variation in the width of material, and means on said winder for so giving off the material to the mandrel structure as to cause it to pass onto the latter at substantially uniform tension throughout its width, the last said means being adapted to be adjusted in accordance with different relative speeds of the mandrel structure and the winder.

16. Apparatus for producing a tubular structure, said apparatus comprising means for internally supporting and continuously withdrawing from winding position a helically wound tubular structure, a winder for progressively forming said structure as it is so withdrawn, means for varying the relative speed of said withdrawing means and said winder during the winding operation, means on said winder for giving off material under tension to the internal supporting means, and means for so varying the angular position of the last said means on said winder during the winding operation as to cause the winding to pass onto the internal supporting means at substantially uniform tension throughout the width of convolution.

17. Apparatus for producing a tubular structure of flexible material, said apparatus comprising a projecting mandrel structure adapted to feed from its projecting end a flexible tubular structure formed thereon, and means for winding flexible material onto said mandrel structure to form a tubular structure of said material thereon, said mandrel structure comprising a plurality of intercalated sets of winding-form members and means for imparting feeding and recessive movements to the members of the sets in periodic order.

18. Apparatus for producing a tubular structure of flexible material, said apparatus comprising a projecting mandrel structure adapted to feed from its projecting end a flexible tubular structure formed thereon, and means for laying flexible material onto said mandrel structure to form a tubular structure of said material thereon, said mandrel structure comprising a series of form members adapted to fit within the tubular structure and driving means for extending and holding one set of said members radially outward against the work and driving them toward the delivery end of the mandrel structure while they are so held and then withdrawing them inward and effecting their return movement while they are thus withdrawn inward, and means for likewise actuating another set of said members in alternation with the first set.

19. Apparatus for producing a tubular structure of flexible material, said apparatus comprising a projecting mandrel structure adapted to feed from its projecting end a flexible tubular structure formed thereon, and means for laying flexible material onto said mandrel structure to form a tubular structure of said material thereon, said mandrel structure comprising a series of winding form members adapted to fit within the tubular structure and driving means for extending and holding one set of said members radially outward against the work and driving them toward the delivery end of the mandrel structure while they are so held and then withdrawing them inward and effecting their return movement while they are thus withdrawn inward, and means for likewise actuating another set of said members in alternation with the first set, the driving means for each of the two said sets of winding-form members being adapted to effect the return movement more quickly than the forward, feeding movement, and thus to cause each set to engage the work and move forward therewith before the other set has completed its forward, feeding movement.

20. Apparatus for producing a tubular structure of flexible material, said apparatus comprising a projecting mandrel structure adapted to feed from its projecting end a flexible tubular structure formed thereon, means for laying flexible material onto said mandrel structure to form a tubular structure of said material thereon, said mandrel structure comprising intercalated sets of longitudinally disposed winding-form bars constituting a tubular grating, and means extending into said grating from one end thereof for supporting said bars and effecting an orbital feeding and recessive movement of the bars of each set in such periodic relation to the movement of the other bars as to provide a continuous, non-rhythmic feed of the work.

21. Apparatus for producing a tubular structure of flexible material, said apparatus comprising a projecting mandrel structure adapted to feed from its projecting end a flexible tubular structure formed thereon, and means for laying flexible material onto said mandrel structure to form a tubular structure of said material thereon, said mandrel structure comprising intercalated sets of vertically disposed winding-form bars constituting a tubular grating, and means extending into said grating from the upper end thereof for supporting said bars and effecting an orbital feeding and recessive movement of the bars of each set in such periodic relation to the movement of the other bars as to provide a continuous, non-rhythmic feed of the work.

22. Apparatus for producing a tubular structure of flexible material, said apparatus comprising a projecting mandrel structure adapted to feed from its projecting end a flexible tubular structure formed thereon, and means for laying flexible material onto said mandrel structure to form a tubular structure of said material thereon, said mandrel structure comprising longitudinally disposed winding-form bars constituting a tubular grating, a pair of members within said grating adapted by relative movement longitudinally of the grating to reciprocate bars of the grating radially of the latter, and by longitudinal movement together to reciprocate said bars longitudinally of the grating, and means for reciprocating said pair of members longitudinally of the grating with respective strokes of such timed relation as to move the bars radially outward at one end of their longitudinal stroke and radially inward at the other end thereof.

23. Apparatus for producing a tubular structure of flexible material, said apparatus comprising a projecting mandrel structure adapted to feed from its projecting end a flexible tubular structure formed thereon, and means for laying flexible material onto said mandrel structure to form a tubular structure of said material thereon, said mandrel structure being adapted to be expanded and contracted for work of different diameters without substantial substitution of parts.

24. Apparatus for producing a tubular structure of flexible material, said apparatus comprising a projecting mandrel structure adapted to feed from its projecting end a flexible tubular structure formed thereon, and means for laying flexible material onto said mandrel structure to form a tubular structure of said material thereon, said mandrel structure comprising a series of form members adapted to fit within the tubular structure and driving means for extending and holding one set of said members radially outward against the work and driving them toward the delivery end of the mandrel structure while they are so held and then withdrawing them inward and effecting their return movement while they are thus withdrawn inward, and means for likewise actuating another set of said members in alternation with the first set, said mandrel structure being adapted to be expanded and contracted for work of different diameters without substantial substitution of parts.

25. Apparatus for producing a tubular structure of flexible material, said apparatus comprising a projecting mandrel structure adapted to feed from its projecting end a flexible tubular structure formed thereon, and means for laying flexible material onto said mandrel structure to form a tubular structure of said material thereon, said mandrel structure comprising longitudinally disposed bars constituting a tubular grating, a pair of members within said grating adapted by relative movement longitudinally of the grating to reciprocate bars of the grating radially of the latter, and by longitudinal movement together to reciprocate said bars longitudinally of the grating and means for reciprocating said pair of members longitudinally of the grating with respective strokes of such timed relation as to move the bars radially outward at one end of their longitudinal stroke and radially inward at the other end thereof, and means for adjusting one of said pair of members with relation to its actuating means so as to vary its stroke with relation to that of the other member and thus adapt the mandrel structure for work of different diameters.

26. Apparatus for making endless bands, said apparatus comprising a projecting mandrel structure, means for progressively forming a tubular structure of material thereon, means for effecting a feeding of said tubular structure from the projecting end of said mandrel structure as it is formed, and severing means for cutting said tubular structure transversely into endless bands as it passes from said mandrel structure, said severing means comprising a knife, a knife carrier adapted continuously to carry said knife circumferentially along the wall of the tubular structure but normally out of contact therewith, and means for momentarily so extending the knife as to cause it to engage the work and circumferentially cut the same.

27. Apparatus for making endless bands, said apparatus comprising a projecting mandrel structure, means for progressively forming a tubular structure of material thereon, means for effecting a feeding of said tubular structure from the projecting end of said mandrel structure as it is formed, and severing means for cutting said tubular structure transversely into endless bands as it passes from said mandrel structure, said severing means comprising a knife, a knife carrier adapted continuously to carry said knife circumferentially along the wall of the tubular structure but normally out of contact therewith, a knife-extending and retracting member mounted to rotate with said knife carrier and adapted by movement with relation thereto to extend the knife into engagement with the work, and to retract it therefrom, yielding means connecting said knife carrier and said knife-extending and retracting member and adapted to urge the latter toward knife-retracting position, and means for effecting its relative movement in the opposite direction while it rotates with said knife carrier.

28. Apparatus comprising a projecting mandrel structure, means for progressively forming a tubular structure of flexible material thereon, means for effecting a feeding of said tubular structure from the projecting end of said mandrel structure as it is formed, internal clamping means, supported beyond the projecting end of said mandrel structure, for occasionally supporting the wall of said tubular structure against lateral pressure, external clamping means for coacting with said internal clamping means to stop, locally, the feed of said tubular structure, and cutting means adapted to act upon the latter as it is held between said clamping means.

29. Apparatus as described in claim 28 in which each of the clamping means is formed with parallel, spaced apart clamping faces adapted to coact respectively with those of the other, and the cutting means comprises a slitting knife adapted to slit the work between the two zones thereof which are clamped between the two pairs of clamping faces.

30. Apparatus for producing a tubular structure, said apparatus comprising a winder, a mandrel structure projecting through said winder and adapted to feed the work from its projecting end, means for driving the winder at such speed with relation to the feed of the work and the width of convolution as to cause successive convolutions substantially to engage each other at their margins, a stock-roll on said winder, and driven means on said winder for withdrawing material from said stock roll and giving it off to said mandrel structure.

31. Apparatus for producing a tubular structure, said apparatus comprising a winder, mandrel means adapted to be moved axially of the orbit of said winder to receive a helical winding therefrom, and material-supplying means on said winder adapted to give off material onto said mandrel means, said material supplying means including a floating roller adapted to ride in a storage loop of said material.

32. Apparatus for producing a tubular structure, said apparatus comprising a winder, mandrel means adapted to be moved axially of the orbit of said winder to receive a helical winding therefrom, and material-supplying means on said winder adapted to give off material onto said mandrel means, said material supplying means comprising a floating roller adapted to ride in a storage loop of said material, and means responsive to movement of said floating roller for feeding material into said storage loop.

33. Apparatus for producing a tubular structure, said apparatus comprising a winder, mandrel means adapted to be moved axially of the orbit of said winder to receive a helical winding therefrom, and material supplying means on said winder adapted to give off material to said mandrel means, said material supplying means including rotary material-guiding means adapted to turn a web of material from one plane into another and into a course in the second plane oblique to the line of initial contact of the web with said guiding means without substantial slippage of the web on said guiding means.

34. Apparatus for producing a tubular structure of flexible material, said apparatus comprising a winder, mandrel means adapted to be moved axially of the orbit of said winder to receive a helical winding therefrom, and material-supplying means on said winder for giving off material onto said mandrel means, said material-supplying means comprising a guide-drum positioned obliquely with relation to the adjacent reaches of the material running thereon and comprising an inner structure and facing members movably mounted thereon and adapted to run longitudinally of the drum in one direction while in contact with the material and in the opposite direction while out of contact with the material.

35. Apparatus for producing a tubular structure of flexible material, said apparatus comprising a winder, mandrel means adapted to be moved axially of the orbit of said winder to receive a helical winding therefrom, and material-supplying means on said winder for giving off material onto said mandrel means, said material-supplying means comprising a guide-drum positioned obliquely with relation to the adjacent reaches of the material running thereon and comprising an inner structure, facing members movably mounted thereon and adapted to run longitudinally of the drum in one direction while in contact with the material and in the opposite direction while out of contact with the material, and stationary cam means for controlling the longitudinal movement of said facing members.

36. Apparatus for handling flexible material in web form, said apparatus comprising means for longitudinally feeding the web of material and rotary guiding means over which said feeding means is adapted to draw the material, said guiding means being adapted to turn the web from one plane into another and into a course in the second plane oblique to the line of initial contact of the web with said guiding means without substantial slippage of the web on said guiding means.

37. Apparatus for handling flexible material in web form, said apparatus comprising means for longitudinally feeding the web of material and a guiding drum over which said feeding means is adapted to draw the web, said drum being positioned obliquely with relation to the adjacent reaches of the web and comprising an inner structure and a set of facing bars movably mounted thereon and adapted to run longitudinally of the drum in one direction while in contact with the web and in the opposite direction while out of contact therewith.

38. Apparatus for producing a tubular structure of flexible material, said apparatus comprising a winder, mandrel means adapted to be moved axially of the orbit of said winder to receive a helical winding therefrom, and material-supplying means on said winder for giving off material onto said mandrel means, said material-supplying means comprising a guide-drum positioned obliquely with relation to the adjacent reaches of the material running thereon and comprising an inner structure, a set of longitudinally disposed facing bars movably mounted thereon and adapted to run longitudinally of the drum in one direction while in contact with the material and in the opposite direction while out of contact with the material, and stationary cam means for controlling the longitudinal movement of said facing bars.

In witness whereof we have hereunto set our hands this 8th day of April, 1925.

JOHN R. GAMMETER.
FLORAIN J. SHOOK.
GEORGE F. WILSON.